(12) United States Patent
Kimoto

(10) Patent No.: US 8,306,113 B2
(45) Date of Patent: Nov. 6, 2012

(54) MOVING PICTURE ENCODING METHOD, MOVING PICTURE DECODING METHOD, MOVING PICTURE ENCODING DEVICE, MOVING PICTURE DECODING DEVICE, AND COMPUTER PROGRAM

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 2072 days.

(21) Appl. No.: 10/563,618

(22) PCT Filed: Jul. 9, 2004

(86) PCT No.: PCT/JP2004/009825
§ 371 (c)(1),
(2), (4) Date: Jan. 6, 2006

(87) PCT Pub. No.: WO2005/006766
PCT Pub. Date: Jan. 20, 2005

(65) Prior Publication Data
US 2006/0165167 A1    Jul. 27, 2006

(30) Foreign Application Priority Data

Jul. 9, 2003 (JP) ................. 2003-272386

(51) Int. Cl.
| H04B 1/66 | (2006.01) |
| H04N 7/12 | (2006.01) |
| H04N 11/02 | (2006.01) |
| H04N 11/04 | (2006.01) |

(52) U.S. Cl. .................. 375/240.11; 382/233
(58) Field of Classification Search ............. 375/240.11, 375/240; 382/233, 245
See application file for complete search history.

(56) References Cited

U.S. PATENT DOCUMENTS

| 5,592,226 A * | 1/1997 | Lee et al. ................ 375/240.14 |
| 5,596,362 A * | 1/1997 | Zhou ........................ 348/14.01 |
| 5,659,363 A * | 8/1997 | Wilkinson ............... 375/240.11 |
| 6,067,383 A * | 5/2000 | Taniguchi et al. ............ 382/240 |
| 6,519,284 B1 * | 2/2003 | Pesquet-Popescu et al. ........................ 375/240.11 |
| 6,985,630 B2 * | 1/2006 | Kajiwara ..................... 382/233 |
| 7,027,512 B2 * | 4/2006 | Jeon ........................ 375/240.16 |

FOREIGN PATENT DOCUMENTS

JP       9-98434 A     4/1997

(Continued)

OTHER PUBLICATIONS

Jens-Rainer Ohm, "Three-Dimensional Subband Coding With Motion Compensation," IEEE Transactions on Image Processing, vol. 3, No. 5, Sep. 1994.

(Continued)

*Primary Examiner* — Aristocratis Fotakis
*Assistant Examiner* — Freshteh N Aghdam
(74) *Attorney, Agent, or Firm* — Sughrue Mion, PLLC

(57) ABSTRACT

There is provided a moving picture encoding method based on hierarchical encoding. The method includes the step of encoding a time filtering lower hierarchical signal belonging to a lower hierarchy among signals of respective hierarchies which have been subjected to time-direction filtering and then to hierarchical division and an upper hierarchy time filtering signal obtained by performing time-direction filtering on a signal corresponding to the upper hierarchy of the aforementioned lower hierarchy signal. Thus, decoded signals of all the hierarchies can have image quality equivalent to the decoded image when encoding is performed with a single hierarchy.

31 Claims, 20 Drawing Sheets

FOREIGN PATENT DOCUMENTS

| | | |
|---|---|---|
| WO | WO 01/06794 A1 | 1/2001 |
| WO | WO 01/84847 A1 | 11/2001 |

OTHER PUBLICATIONS

Hamid Gharavi, "Subband Coding Algorithms for Video Applications: Videophone to HDTV-Conferencing," IEEE Transactions on Circuits and Systems for Video Technology, vol. 1, No. 2, Jun. 1991.

Andrew Secker, et al. "Motion-Compensated Highly Scalable Video Compression Using an Adaptive 3D Wavelet Transform Based on Lifting," IEEE, 2001.

Lin Luo, et al. "Motion Compensated Lifting Wavelet and Its Application in Video Coding," IEEE International Conference on Multimedia and Expo, 2001.

Jerome M. Shapiro, "Embedded Image Coding Using Zerotrees of Wavelet Coefficients," IEEE Transactions on Signal Processing, vol. 41, No. 12, Dec. 1993.

Jo Yew Tham, et al. "Highly Scalable Wavelet-Based Video Codec for Very Low Bit-Rate Environment," IEEE Journal on Selected Areas in Communications, vol. 16, No. 1, Jan. 1998.

John W. Woods, "A Resolution and Frame-Rate Scalable Subband/Wavelet Video Coder," IEEE Transactions on Circuits and Systems for Video Technology, vol. 11, No. 9, Sep. 2001.

Vincent Bottreu, et al. "A Fully Scalable 3D Subband Video Codec," IEEE, 2001.

Patrizio Campisi, et al. "Three Dimensional Wavelet Based Approach for a Scalable Video Conference System," IEEE 1999.

Takahiro Kimoto, et al. "3-D Wavelet Transformation With Perfect Reconstruction on Spatial Scalability," 2003 Nen Gazo Fugoka Symposium, Nov. 2003.

* cited by examiner

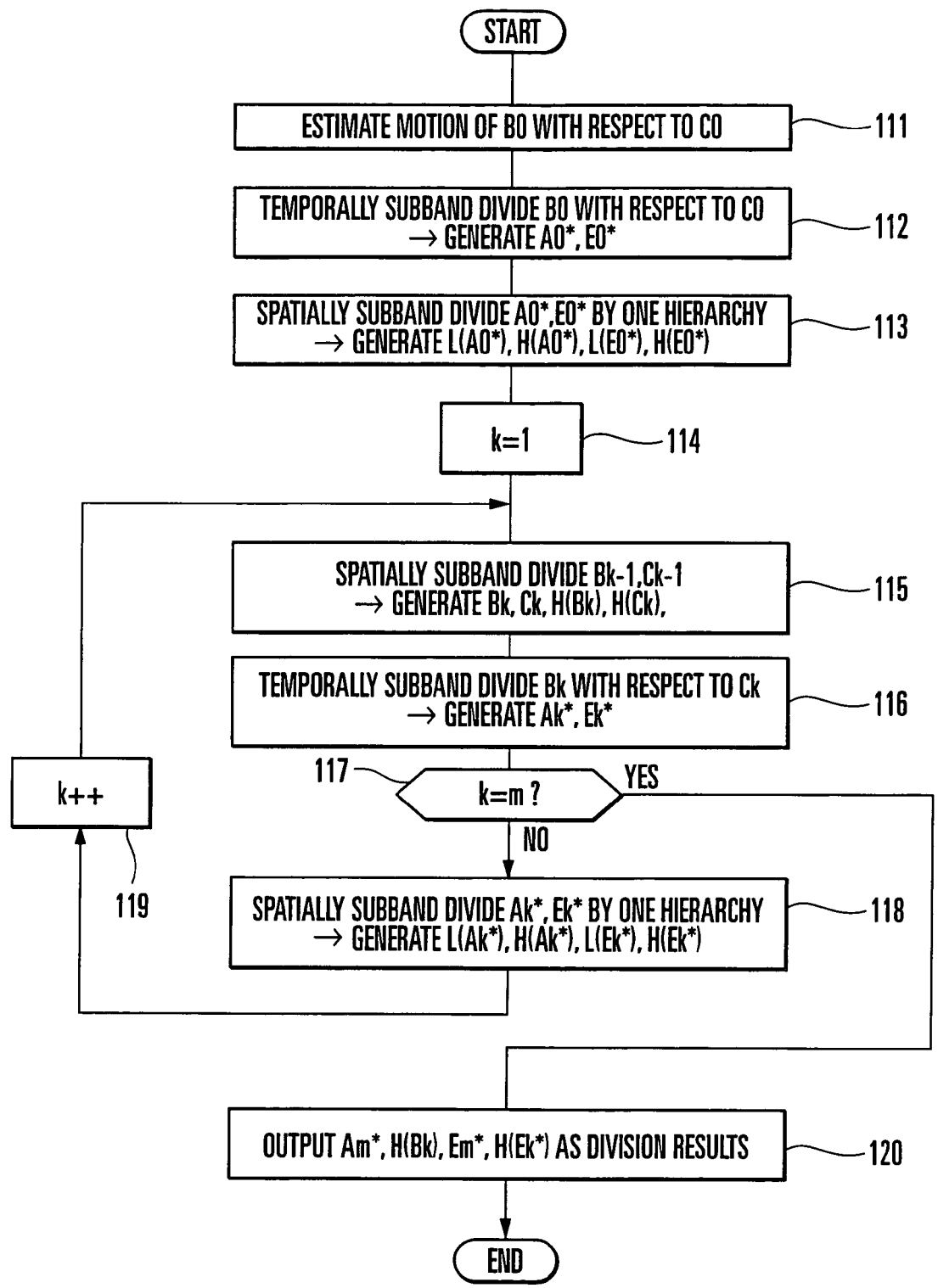
F I G. 8

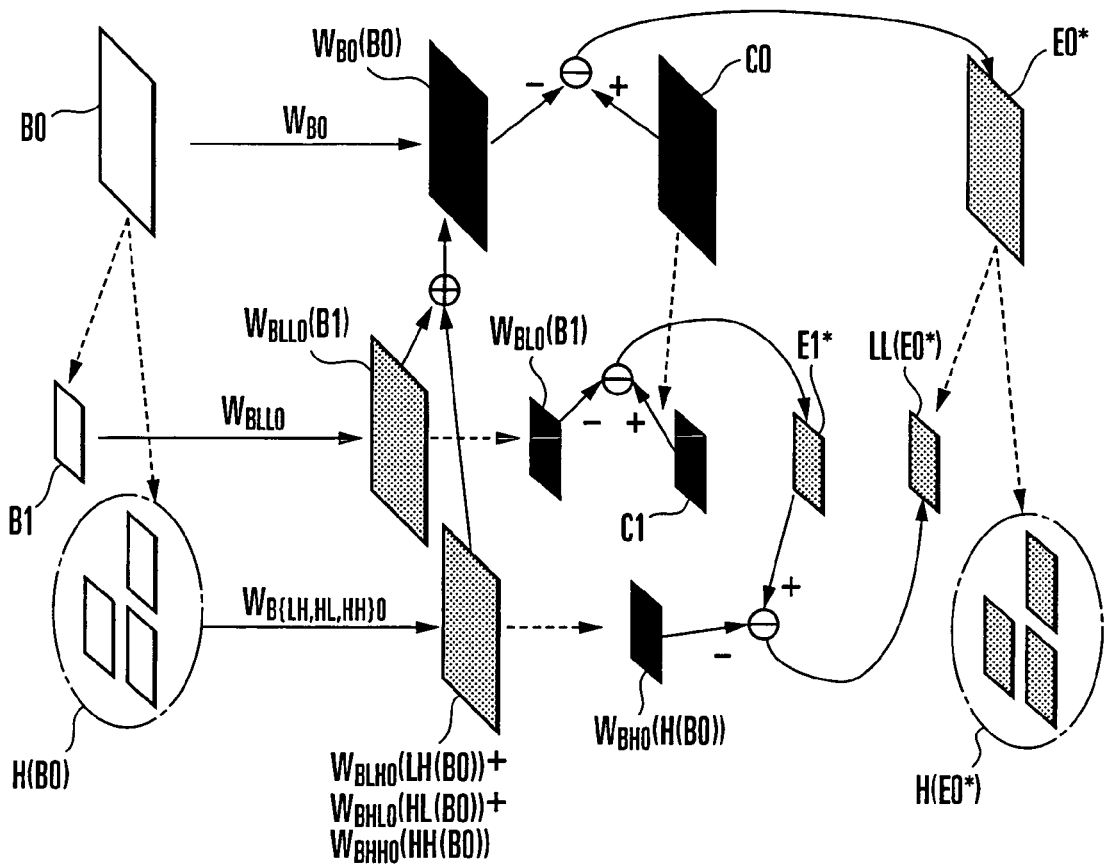
F I G. 9
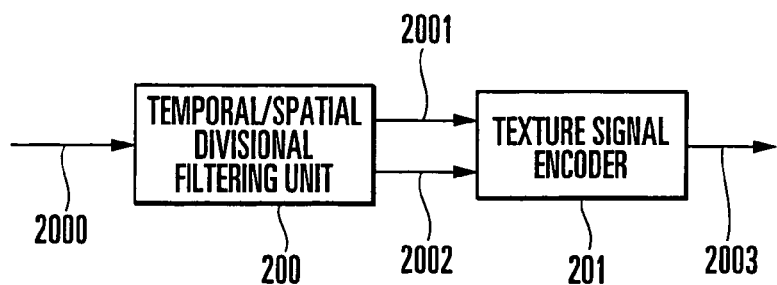
F I G. 10

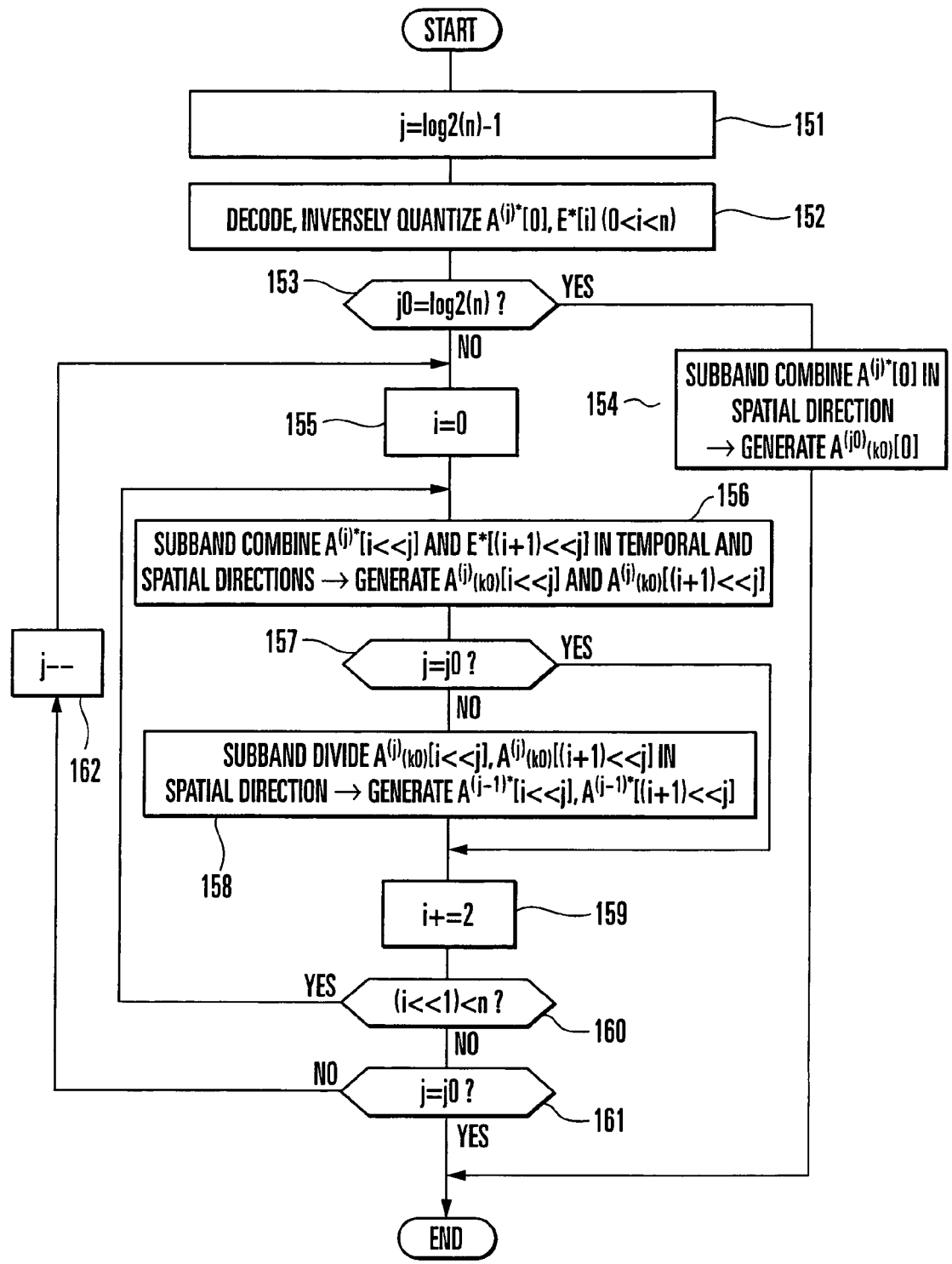
F I G. 18 and COMPUTER PROGRAM

MOVING PICTURE ENCODING METHOD, MOVING PICTURE DECODING METHOD, MOVING PICTURE ENCODING DEVICE, MOVING PICTURE DECODING DEVICE, AND COMPUTER PROGRAM

TECHNICAL FIELD

The present invention relates to moving picture encoding/decoding methods, moving picture encoding/decoding devices, and their computer programs.

BACKGROUND ART

Subband encoding is a method of dividing the frequency of an image signal and encoding a signal (subband signal) of each frequency band. Unlike block-based orthogonal transform such as discrete cosine transform, subband encoding has the characteristics that no block distortion occurs in principle, and hierarchical encoding can be easily realized by recurrently dividing low-frequency components. Subband encoding using wavelet transform in JPEG 2000 as an international standard encoding method is used for still pictures.

When subband encoding is applied to moving picture encoding, not only a correlation in a spatial direction but also a correlation in a temporal direction of a signal must be taken into consideration. Subband moving picture encoding is roughly classified into two methods: a method in which subband encoding is performed for each frame after a correlation in the temporal direction is removed by performing motion compensation on the original image in a spatial region, and a method in which this correlation in the temporal direction is removed by performing motion compensation for each subband region after the original image is divided into subbands.

FIG. 25 is a flowchart showing the flow of a conventional coding process (non-patent reference 1: J.-R. Ohm, "Three-dimensional subband coding with motion compensation", IEEE Trans, Image Processing, vol. 3, pp. 559-571, September 1999) which performs motion compensation in a spatial region. A process of encoding a set $A(0)[i]$ ($0 \leq i < n$, n is the power of 2) of consecutive frames will be explained below with reference to FIG. 25. First, two consecutive frames $A(0)[i]$ and $A(0)[i+1]$ are subband divided in the temporal direction by setting j=1 and i=0, 2, ..., n−2 (steps 201 and 202), thereby obtaining $A(1)[i]$ in a low-frequency band and $E[i+1]$ in a high-frequency band (steps 203, 204, and 205). Then, consecutive low-frequency-band signals $A(1)[i<<1]$ and $A(1)[(i+1)<<1]$ are subband divided in the temporal direction by setting j=1 (step S206), thereby obtaining $A(2)[i<<1]$ in a low-frequency band and $E[(i+1)<<1]$ in a high-frequency band (steps 203, 204, and 205). This processing is repeated until frames except for the first frame are encoded as high-frequency-band signals, i.e., until ($1<<j$) becomes n (step 207). After that, $A(j)[0]$ and $E[i]$ ($0<j<n$) are subband divided in the spatial direction and encoded (step 208). In the temporal-direction subband division between two frames, a high-frequency-band signal is equivalent to an error signal of motion compensation prediction, and a low-frequency-band signal is equivalent to an average signal of two motion compensated frames.

In a decoding process, the flow of the above process is traced in the opposite direction, i.e., subband signals are combined in the spatial direction for each frame, and subband combination is performed in the temporal direction in accordance with the frame reference relationship. In the subband signal combination performed frame by frame, a reduced image signal is obtained by stopping the combination without using any high-frequency-component subband. In three-dimensional wavelet coding, a decoded image on a reduced resolution can be obtained by performing temporal-direction subband combination on signals of each frame obtained by partial subband combination. However, when motion compensation in temporal-direction subband division is performed for each small number of pixels, an interpolation process is used in predictive image generation, but this interpolation process is not commutative with subband division. That is, a signal which is subband divided in the spatial direction after being subband divided in the temporal direction is not equal to a signal which is subband divided in the temporal direction after being subband divided in the spatial direction, so a decoded image on the reduced resolution deteriorates much more than a signal obtained by reducing the original signal.

FIG. 26 is a flowchart showing the flow of a conventional coding process (non-patent reference 2: H. Gharavi, "Subband Coding Algorithm for Video Applications: Videophone to HDTV Conferencing", IEEE Trans., CAS for Video Technology, Vol. 1, No. 2, pp. 174-182, June 1991) which performs motion compensation in a subband region. A process of encoding a set $A[k]$ ($0 \leq k < n$) of consecutive frames will be explained below with reference to FIG. 26. First, each frame is subband divided (step 301). After that, motion compensation prediction is performed for each subband of a frame $A[i]$ ($1 \leq i < n$) and its reference frame $A[i-1]$ (steps 302, 303, 304, and 305). Quantization and lossless encoding are then performed on the obtained prediction error signal of the frame $A[i]$ ($1 \leq i < n$) and on a frame $A[0]$ (step 306). A decoding process is performed by tracing the above process in the opposite direction, i.e., subband coefficients of the prediction error signal of the frame $A[i]$ ($1 \leq i < n$) and the frame $A[0]$ are obtained by performing inverse transforms of the lossless encoding and quantization, and a subband coefficient of the frame $A[i]$ ($1 \leq i < n$) is obtained by performing motion compensation for each subband. After that, a decoded image is obtained by subband combining the individual frames. A reduced decoded image signal is obtained by using no high-frequency-component subbands in this subband combination. Unlike the first conventional coding process which performs motion compensation in a spatial region, no large deterioration except quantization and transform errors is found between the decoded image on the reduced resolution and the reduced signal of the original signal. However, the prediction efficiency largely decreases in motion compensation in a high-frequency band mainly containing edge components, when compared to motion compensation in a spatial region. That is, the second conventional coding method which performs motion compensation in a subband region has the problem that the coding efficiency is lower than that of the first conventional coding method.

Non-patent Reference 1: J.-R. Ohm, "Three-dimensional subband coding with motion compensation", IEEE Trans, Image Processing, vol. 3, pp. 559-571, September 1999

Non-patent Reference 2: H. Gharavi, "Subband Coding Algorithm for Video Applications: Videophone to HDTV Conferencing", IEEE Trans., CAS for Video Technology, Vol. 1, No. 2, pp. 174-182, June 1991

Non-patent Reference 3: A. Secker et. al, "Motion-compensated highly scalable video compression using an adaptive 3D wavelet transform based on lifting", IEEE Trans. Int. Conf. Image Proc., pp 1029-1032, October, 2001

Non-patent Reference 4: Lio et. at., "Motion Compensated Lifting Wavelet And Its Application in Video Coding", IEEE Int. Conf. Multimedia & Expo 2001, August, 2001

Non-patent Reference 5: J. M. Shapiro, "Embedded image coding using zerotrees of wavelets coefficients", IEEE Trans. Signal Processing, vol. 41, pp. 3445-3462, December 1993

DISCLOSURE OF INVENTION

Problems to be Solved by the Invention

Of the two conventional subband moving picture coding methods described above, in the method which performs motion compensation in a spatial region, the image quality of a decoded image obtained by performing decoding only in a low-frequency band of a subband signal is much lower than that of a decoded image obtained when encoding is performed with a single hierarchy. On the other hand, in the method which performs motion compensation in a subband region, the image quality of a decoded image having the same resolution as the original image is much lower than that of a decoded image obtained when encoding is performed with a single hierarchy.

It is an object of the present invention to provide a subband moving picture encoding method and decoding method by which in encoded data hierarchized by subband division, decoded signals of all the hierarchies have image quality equivalent to that of a decoded image when encoding is performed with a single hierarchy.

Means for Solving the Problems

A moving picture encoding method according to the present invention is characterized by including temporal/spatial divisional filtering comprising the steps of obtaining a temporally hierarchized signal by temporally hierarchically dividing a moving picture signal of a certain resolution hierarchy, obtaining a temporally hierarchized spatial high-frequency signal by performing a high frequency generation process on the temporally hierarchized signal in spatial hierarchical division, obtaining a reduced image signal by performing a low-frequency signal generation process on the moving picture signal in spatial hierarchical division, and obtaining a reduced temporally hierarchized signal by temporally hierarchizing the reduced image signal.

A moving picture encoding method according to the present invention is characterized by including temporal/spatial divisional filtering comprising the steps of obtaining a prediction error signal by performing interframe prediction on a moving picture signal of a certain resolution hierarchy, obtaining a prediction error spatial high-frequency signal by performing a high frequency generation process on the prediction error signal in spatial hierarchical division, obtaining a reduced image signal by performing a low-frequency signal generation process on the moving picture signal in spatial hierarchical division, and obtaining a reduced interframe prediction error signal as a prediction error signal by performing interframe prediction on the reduced image signal.

A moving picture encoding method according to the present invention is a moving picture encoding method of repetitively performing a three-dimensional subband dividing process which performs motion compensation prediction on an input moving picture signal and also subband divides the moving picture signal in a spatial direction, characterized in that the three-dimensional subband dividing process comprises the motion detection step of detecting an interframe motion of an input image signal, the motion compensation prediction step of obtaining a prediction error signal by performing motion compensation prediction, in accordance with motion information obtained in the motion detection step, on the input image signal and on an intra-band signal as one band signal of spatial low-frequency subbands which are obtained by spatially subband dividing the input image signal, the prediction error signal spatial division step of generating a spatial low-frequency prediction error subband and spatial high-frequency prediction error subband by spatially subband dividing the prediction error signal, and the band signal spatial division step of generating a spatial low-frequency intra-subband and spatial high-frequency intra-subband by spatially subband dividing the intra-band signal, the motion compensation prediction step, prediction error signal spatial division step, and band signal spatial division step are performed on the moving picture signal, and the motion compensation prediction step, prediction error signal spatial division step, and band signal spatial division step are recurrently repeated by using the spatial low-frequency intra-subband obtained after the band signal spatial division step as the intra-band signal.

A moving picture encoding method according to the present invention is a moving picture encoding method of repetitively performing a three-dimensional subband dividing process which subband divides an input image signal in both a temporal direction and spatial direction, characterized in that the three-dimensional subband dividing process comprises the motion detection step of detecting an interframe motion of an input moving picture signal, the temporal subband division step of obtaining a temporal low-frequency subband and temporal high-frequency subband by performing motion compensation in accordance with motion information obtained in the motion detection step and then performing temporal subband division, on the moving picture signal and on an intra-band signal as one band signal of spatial low-frequency subbands which are obtained by spatially subband dividing the moving picture signal, the temporal high-frequency subband spatial division step of generating a temporal high-frequency/spatial low-frequency subband and temporal high-frequency/spatial high-frequency subband by spatially subband dividing the temporal high-frequency subband signal, the temporal low-frequency subband spatial division step of generating a temporal low-frequency/spatial low-frequency subband and temporal low-frequency/spatial high-frequency subband by spatially subband dividing the temporal low-frequency subband, and the band signal spatial division step of generating a spatial low-frequency intra-subband and spatial high-frequency intra-subband by spatially subband dividing the intra-band signal, the temporal subband division step, temporal high-frequency subband spatial division step, temporal low-frequency subband spatial division step, and band signal spatial division step are performed on the moving picture signal, and the temporal subband division step, temporal high-frequency subband spatial division step, temporal low-frequency subband spatial division step, and band signal spatial division step are recurrently repeated by using the spatial low-frequency intra-subband obtained after the band signal spatial division step as the intra-band signal.

A moving picture decoding method according to the present invention is a moving picture decoding method including temporal/spatial combination filtering which refers to a temporal low-frequency signal and temporal high-frequency signal of a certain resolution hierarchy and a temporal low-frequency/spatial high-frequency signal and temporal high-frequency/spatial high-frequency signal adjacent to the temporal low-frequency signal and temporal high-frequency signal, and reconstructs a moving picture signal having a one-step higher resolution, characterized in that the temporal/ spatial combination filtering comprises the steps of combining a temporal high-frequency/spatial low-frequency signal by referring to the temporal high-frequency signal, temporal low-frequency signal, and temporal low-frequency/spatial high-frequency signal, spatially hierarchically combining the temporal high-frequency/spatial low-frequency signal and temporal high-frequency/spatial high-frequency signal, spatially hierarchically combining the temporal low-frequency signal and temporal low-frequency/spatial high-frequency signal, and temporally hierarchically combining these two spatial hierarchical combination results.

A moving picture decoding method according to the present invention is a moving picture decoding method including temporal/spatial combination filtering which refers to an intra-band signal and prediction error signal of a certain resolution hierarchy and an intra-spatial high-frequency signal and prediction error spatial high-frequency signal adjacent to the intra-band signal and prediction error signal, and reconstructs a moving picture signal having a one-step higher resolution, characterized in that the temporal/spatial combination filtering comprises the steps of combining a prediction error spatial low-frequency signal by referring to the prediction error signal, intra-band signal, and intra-spatial high-frequency signal, spatially hierarchically combining the prediction error spatial low-frequency signal and prediction error spatial high-frequency signal, spatially hierarchically combining the intra-band signal and temporal high-frequency/spatial high-frequency signal, and performing interframe prediction decoding on these two spatial hierarchical combination results.

A moving picture decoding method according to the present invention is a moving picture decoding method of receiving moving picture encoded data, and generating a decoded image signal by a three-dimensional subband combining process which subband combines subband signals in a spatial direction for each frame, and performs motion compensation on the combined intra-band signal and a prediction error signal, characterized in that the three-dimensional subband combining process comprises the spatial low-frequency prediction error subband combination step of combining a spatial low-frequency prediction error subband by referring to a prediction error signal of a certain resolution hierarchy and at least one of an intra-band signal in the same frequency band as the prediction error signal, and a spatial high-frequency intra-subband as a spatial high-frequency subband adjacent to the intra-band signal, the prediction error signal combination step of generating a combined prediction error signal by combining the spatial low-frequency prediction error subband and a spatial high-frequency prediction error subband as a spatial high-frequency subband adjacent to the spatial low-frequency prediction error subband, the intra-band signal spatial combination step of combining the intra-subband and spatial high-frequency intra-subband, and the motion compensation decoding step of obtaining the decoded image signal by adding the combined prediction error signal by performing motion compensation prediction on the intra-band signal, and the spatial low-frequency prediction error subband combination step, prediction error signal combination step, and intra-band signal spatial combination step are recurrently repeated by regarding the combined prediction error signal obtained in the prediction error signal combination step as a new prediction error signal, and the band signal obtained in the intra-band signal spatial combination step as a new intra-band signal.

A moving picture decoding method according to the present invention is a moving picture decoding method of receiving moving picture encoded data, and generating a decoded image signal by a three-dimensional subband combining process which subband combines subband signals in a spatial direction for each frame, and combines a temporal low-frequency subband and temporal high-frequency subband in a temporal direction, characterized in that the three-dimensional subband combining process comprises the temporal high-frequency/spatial low-frequency subband combination step of combining a temporal high-frequency/spatial low-frequency subband by referring to a temporal high-frequency subband of a certain resolution hierarchy and at least one of a temporal low-frequency subband in the same frequency band as the temporal high-frequency subband, and a temporal low-frequency/spatial high-frequency subband as a high-frequency-band subband adjacent to the temporal low-frequency subband, the temporal high-frequency subband combination step of generating a combined temporal high-frequency subband by combining the temporal high-frequency/spatial low-frequency subband and a temporal high-frequency/spatial high-frequency subband as a high-frequency-band subband adjacent to the temporal high-frequency/spatial low-frequency subband, the temporal low-frequency subband spatial combination step of generating a combined temporal low-frequency subband by combining the temporal low-frequency subband and temporal low-frequency/spatial high-frequency subband, and the temporal-direction combination step of performing motion compensation on the combined temporal low-frequency subband and combined temporal high-frequency subband, and a temporal low-frequency subband and temporal high-frequency subband having the same resolution as the decoded image signal are generated by recurrently repeating the temporal high-frequency subband combination step and temporal low-frequency subband spatial combination step, by regarding the combined temporal high-frequency subband obtained in the temporal high-frequency subband combination step as a new temporal high-frequency subband, and the combined temporal low-frequency subband obtained in the temporal low-frequency subband combination step as a new temporal low-frequency subband.

An outline of temporal/spatial divisional filtering in moving picture encoding as the characteristic feature of the present invention will be explained below with reference to FIG. 1.

In the temporal/spatial divisional filtering, a moving picture signal 10 of a certain resolution hierarchy is divided into a temporal low-frequency signal 11 and temporal high-frequency signal 12 by temporal hierarchization.

Then, a high-frequency generation process in spatial hierarchization is performed on the temporal low-frequency signal 11 and temporal high-frequency signal 12, thereby generating a temporal low-frequency/spatial high-frequency signal 13 and temporal high-frequency/spatial high-frequency signal 14.

Also, a low-frequency generation process in spatial hierarchization is performed on the moving picture signal 10 to generate a reduced image signal 15.

The reduced image signal 15 is temporally hierarchized to obtain a temporal low-frequency signal 16 and temporal high-frequency signal 17.

The temporal low-frequency/spatial high-frequency signal 13, temporal high-frequency/spatial high-frequency signal 14, temporal low-frequency signal 16, and temporal high-frequency signal 17 are output as the results of division of the moving picture signal 10. By regarding the reduced image signal 15 as the moving picture signal 10, the temporal low-frequency signal 16 as the temporal low-frequency signal 11, and the temporal high-frequency signal 17 as the temporal high-frequency signal 12, temporal/spatial divisional filtering is recurrently performed to hierarchize the moving picture signal in multiple stages.

An outline of temporal/spatial combination filtering in moving picture decoding as the characteristic feature of the present invention will be explained below with reference to FIG. 2.

In the temporal/spatial combination filtering, signals to be combined are the temporal low-frequency signal 16, temporal high-frequency signal 17, temporal low-frequency/spatial high-frequency signal 13, and temporal high-frequency/spatial high-frequency signal 14.

First, the temporal low-frequency signal 16 and temporal high-frequency signal 17 are temporally hierarchically combined to reconstruct the reduced image signal 15.

Also, the temporal low-frequency signal 16 and temporal low-frequency/spatial high-frequency signal are spatially hierarchically combined to reconstruct the temporal low-frequency signal 11.

Then, a temporal high-frequency/spatial low-frequency signal 18 is reconstructed from the reduced image signal 15 and temporal low-frequency signal 11.

The temporal high-frequency/spatial low-frequency signal 18 and temporal high-frequency/spatial high-frequency signal 14 are spatially hierarchically combined to reconstruct the temporal high-frequency signal 12. The temporal low-frequency signal 11 and temporal high-frequency signal 12 are temporally hierarchically combined to reconstruct the moving picture signal 10.

Multistage hierarchical combination is obtained by recurrently performing temporal combination filtering by regarding the moving picture signal 10 as the reduced image signal 15.

In the temporal/spatial combination filtering shown in FIG. 2, the reduced image signal 15 must be reconstructed in order to reconstruct the temporal high-frequency/spatial low-frequency signal 18. As another characteristic feature of the present invention, the temporal/spatial combination filtering can be further simplified by performing the temporal hierarchization shown in FIG. 1 and the temporal hierarchical combining process shown in FIG. 2 by taking spatial hierarchies into consideration. An outline of the simplified temporal/spatial combination filtering will be explained below with reference to FIG. 3.

First, a temporal low-frequency/spatial low-frequency signal 19 is reconstructed from the temporal low-frequency signal 16 and temporal high-frequency/spatial high-frequency signal 14. Also, the temporal high-frequency/spatial low-frequency signal 18 is reconstructed from the temporal high-frequency signal 17 and temporal low-frequency/spatial high-frequency signal 14.

The temporal low-frequency/spatial low-frequency signal 19 and temporal low-frequency/spatial high-frequency signal 13 are spatially hierarchically combined to reconstruct the temporal low-frequency signal 11. Also, the temporal high-frequency/spatial low-frequency signal 18 and temporal low-frequency/spatial high-frequency signal 14 are spatially hierarchically combined to reconstruct the temporal high-frequency signal 12. The temporal low-frequency signal 11 and temporal high-frequency signal 12 are temporally hierarchically combined to reconstruct the moving picture signal 10.

Multistage hierarchical combination is performed by recurrently performing the temporal/spatial combination filtering by regarding the temporal low-frequency signal 11 as the temporal low-frequency signal 16, and the temporal high-frequency signal 12 as the temporal high-frequency signal 17.

Effects of the Invention

In the moving picture encoding method and decoding method according to the present invention, after motion compensation and temporal subband division are performed in a spatial region, low-frequency-band components are recurrently replaced with the results of motion compensation in a subband region. Accordingly, a decoded image on a reduced resolution has image quality equivalent to that of the conventional subband-region-based encoding method. Also, the decrease in image quality caused by the replacement of the low-frequency-band components is very small, so a decoded image at the original resolution has image quality equivalent to that of the conventional spatial-region-based encoding method. That is, in the moving picture encoding method and decoding method according to the present invention, in encoded data hierarchized by subband division, decoded signals of all the hierarchies realize image quality equivalent to that of a decoded image when encoding is performed with a single hierarchy.

BRIEF DESCRIPTION OF DRAWINGS

FIG. 8 is a flowchart showing the flow of a temporal/spatial subband dividing process for two frames shown in FIG. 7;

FIG. 9 is a conceptual view for explaining motion compensation in a low-frequency band;

FIG. 10 is a block diagram showing the arrangement of a moving picture encoding device according to an embodiment of the present invention;

FIG. 18 is a flowchart showing the flow of processing of a moving picture decoding method according to an embodiment of the present invention;

BEST MODE FOR CARRYING OUT THE INVENTION

A moving picture encoding method and moving picture decoding method according to an embodiment of the present invention and a moving picture encoding device and moving picture decoding device which implement these methods will be described in detail below with reference to the accompanying drawings.

Figure 4:
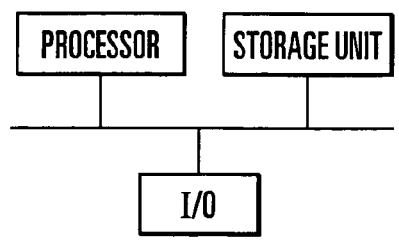
FIG. 4 is a schematic view showing the arrangement of a moving picture encoding device and moving picture decoding device according to an embodiment of the present invention.

As shown in FIG. 4, a first moving picture encoding device and moving picture decoding device according to an embodiment of the present invention includes a processor, storage unit, and I/O interface which are connected to each other via a bus. The storage unit stores one or both of a moving picture encoding program and moving picture decoding program to be executed by the processor, and also functions as a temporary storage while the processor is executing the moving picture encoding program or moving picture decoding program. Note that in this specification, this term "storage unit" is used to indicate any storage devices such as a cache memory included in a CPU, a register included in the processor, and a hard disk device in addition to a main memory such as a RAM. Also, in this embodiment, the I/O interface is a mediating means for transmitting an original image as an input to and encoded data as an output from the moving picture encoding program, and transmitting encoded data as an input to and a decoded image as an output from the moving picture decoding program, under the control of the processor. However, the existence of this I/O interface does not interfere with the process of temporarily storing an original image or encoded data required by another program into the storage unit, and executing the moving picture encoding method or moving picture decoding method according to this embodiment by reading out the image or data from the storage unit.

The moving picture encoding method and moving picture decoding method according to this embodiment will be explained below.

The operations of the first moving picture encoding device and moving picture decoding device as an embodiment of the present invention are performed by the processor by executing the moving picture encoding program and moving picture decoding program, respectively, stored in the storage unit. Also, a second moving picture encoding device and moving picture decoding device as an embodiment of the present invention comprise an operation entity which implements operation steps of the moving picture encoding method and moving picture decoding method, and the input/output relationship between these devices is related to signals referred to and generated by the moving picture encoding method and moving picture decoding method. To simplify the explanation, only the operation of each operation entity will be described below without mentioning the operation entity itself.

The arrangement of a temporal/spatial divisional filtering unit which implements temporal/spatial divisional filtering in moving picture encoding as the characteristic feature of the present invention will be explained below with reference to FIG. 5.

Figure 1:
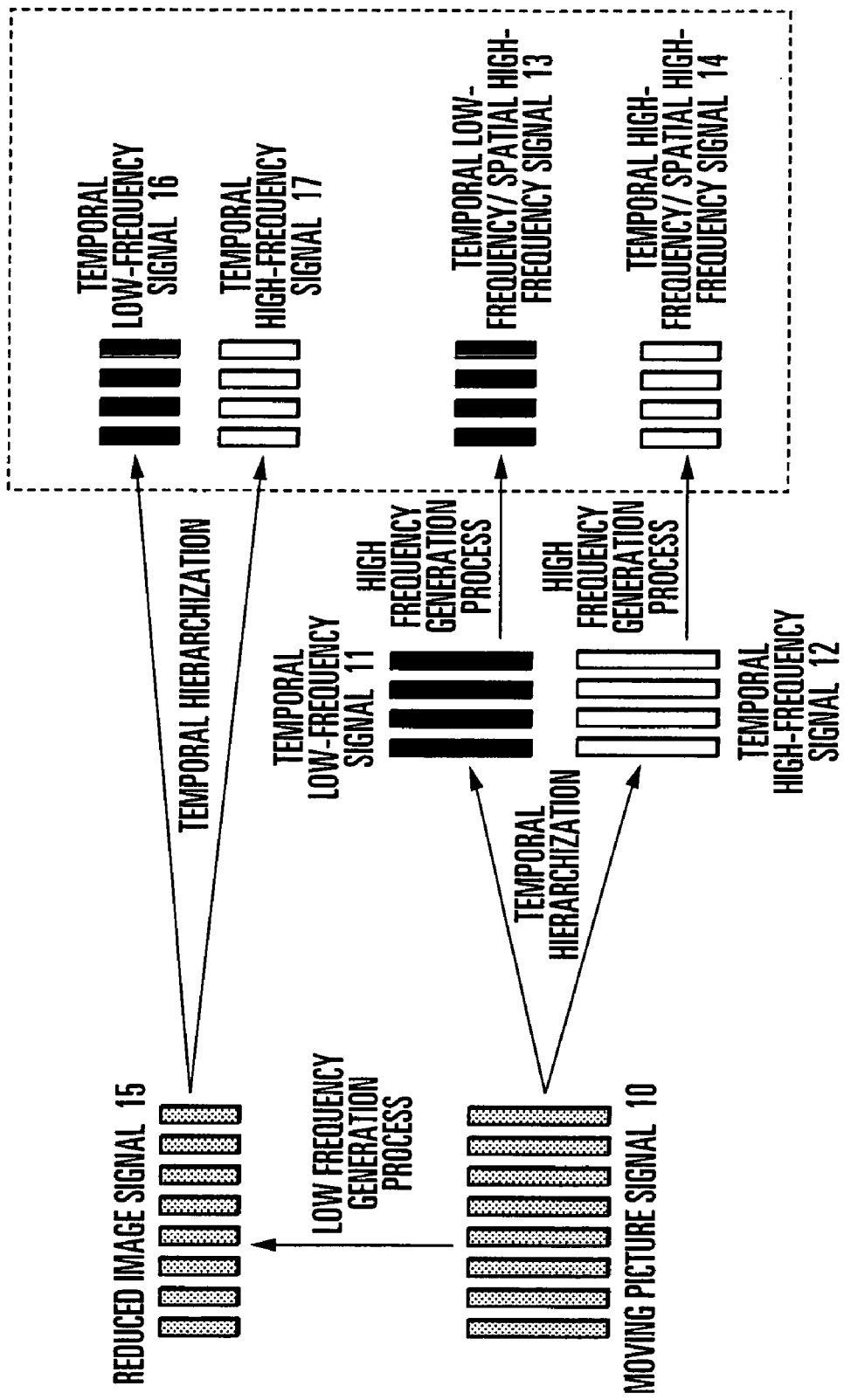
FIG. 1 is a conceptual view for explaining an outline of temporal/spatial divisional filtering in moving picture encoding as the characteristic feature of the present invention.
Figure 5:
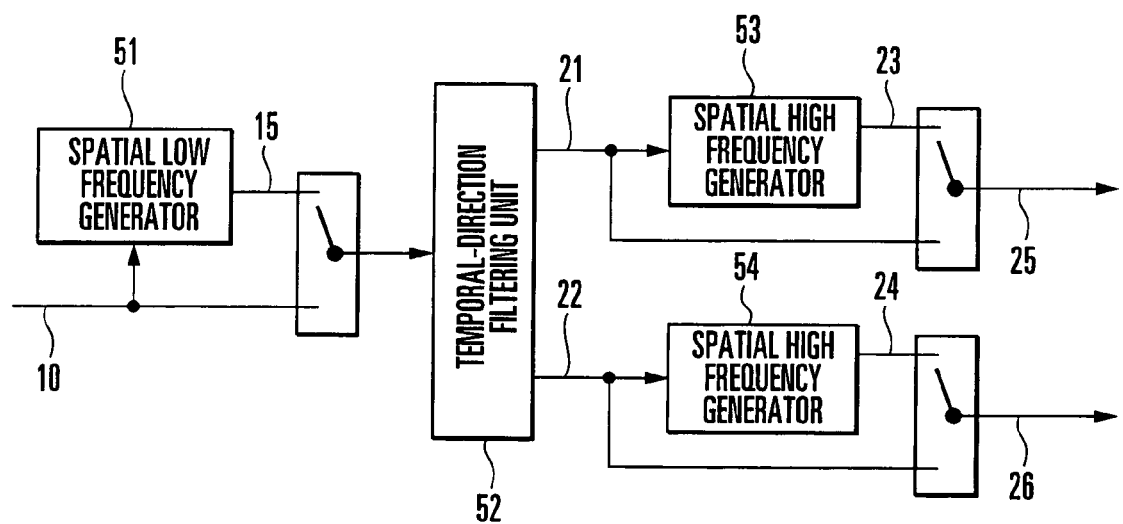
FIG. 5 is a block diagram showing the arrangement of a temporal/spatial divisional filtering unit which implements the temporal/spatial divisional filtering in moving picture encoding as the characteristic feature of the present invention.

Referring to FIG. 5, the temporal/spatial divisional filtering unit includes a spatial low-frequency signal generator 51, spatial high-frequency signal generators 53 and 54, and a temporal-direction filtering unit 52. The moving picture signal 10 and reduced image signal 15 in FIG. 1 correspond to a moving picture signal 10 and reduced image signal 15, respectively, in FIG. 5. The temporal low-frequency signals 11 and 16 in FIG. 1 correspond to a temporal low-frequency signal 21 in FIG. 5, and the temporal low-frequency signals 12 and 17 in FIG. 1 correspond to a temporal low-frequency signal 22 in FIG. 5. The temporal low-frequency/spatial high-frequency signal 13 and temporal high-frequency/spatial high-frequency signal 14 in FIG. 1 correspond to a temporal low-frequency/spatial high-frequency signal 23 and temporal high-frequency/spatial high-frequency signal 24, respectively, in FIG. 5.

Figure 6:
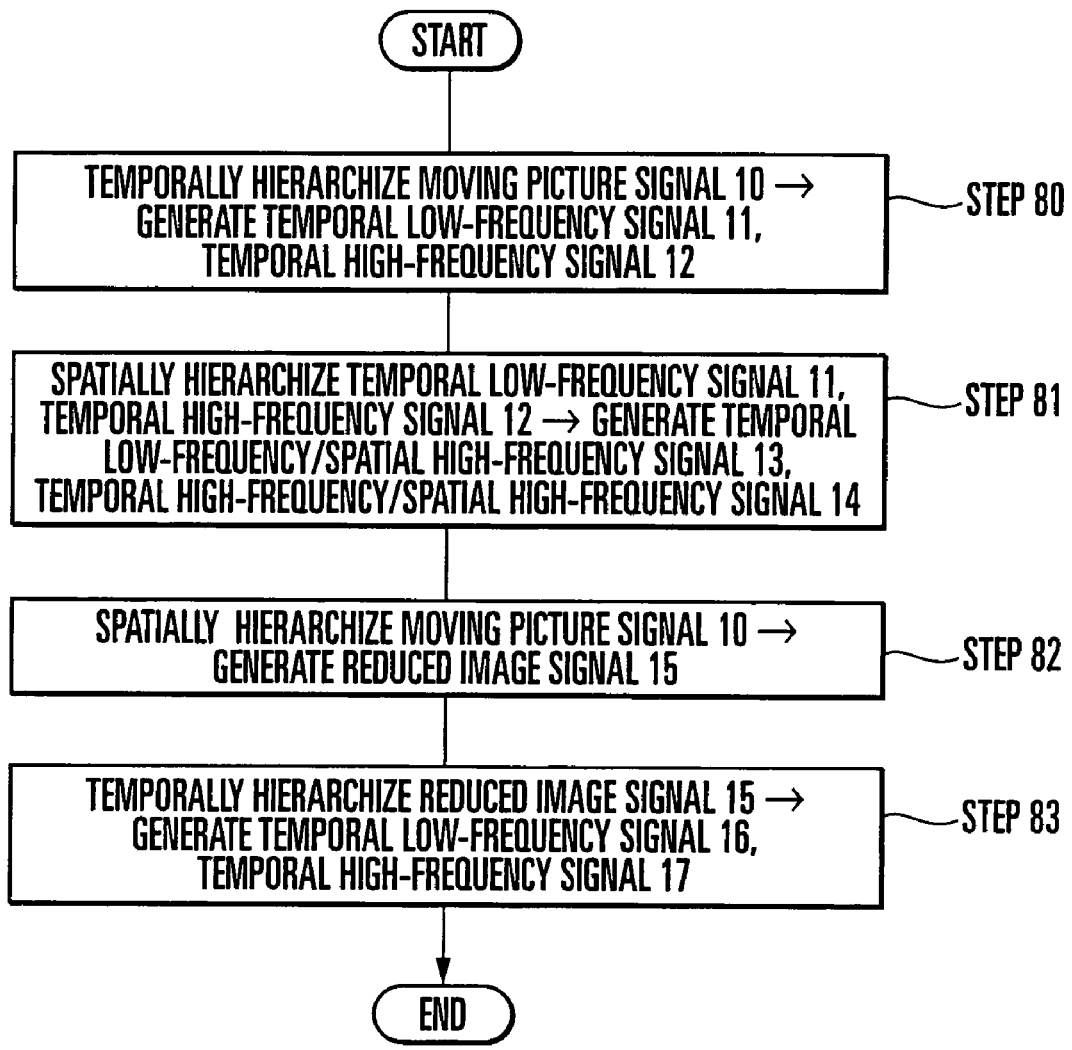
FIG. 6 is a flowchart showing the flow of processing of the temporal/spatial divisional filtering.

The processing of the temporal/spatial divisional filtering shown in FIG. 5 will be explained below with reference to a flowchart shown in FIG. 6.

A moving picture signal 10 is temporally hierarchized by the temporal-direction filtering 52 to generate a temporal low-frequency signal 21 and temporal high-frequency signal 22 (step 80). The temporal low-frequency signal 21 and temporal high-frequency signal 22 undergo high-frequency signal generation processes by spatial hierarchization performed by the spatial high-frequency signal generators 53 and 54, respectively, thereby generating a temporal low-frequency/spatial high-frequency signal 23 and temporal high-frequency/spatial high-frequency signal 24 (step 81). The temporal low-frequency/spatial high-frequency signal 23 and temporal high-frequency/spatial high-frequency signal 24 are output as division result signals 25 and 26, respectively. After that, the spatial low-frequency signal generator performs a low-frequency signal generation process by spatial hierarchization on the moving picture signal 10, thereby generating a reduced image signal 15 (step 82). The temporal-direction filtering unit 52 temporally hierarchizes the reduced image signal 15 to generate a temporal low-frequency signal 21 and temporal high-frequency signal 22 (step 83). The temporal low-frequency signal 21 and temporal high-frequency signal 22 are output as division result signals 25 and 26, respectively.

The moving picture encoding method having temporal/spatial divisional filtering will be explained below with reference to FIGS. 7 and 8.

Figure 7:
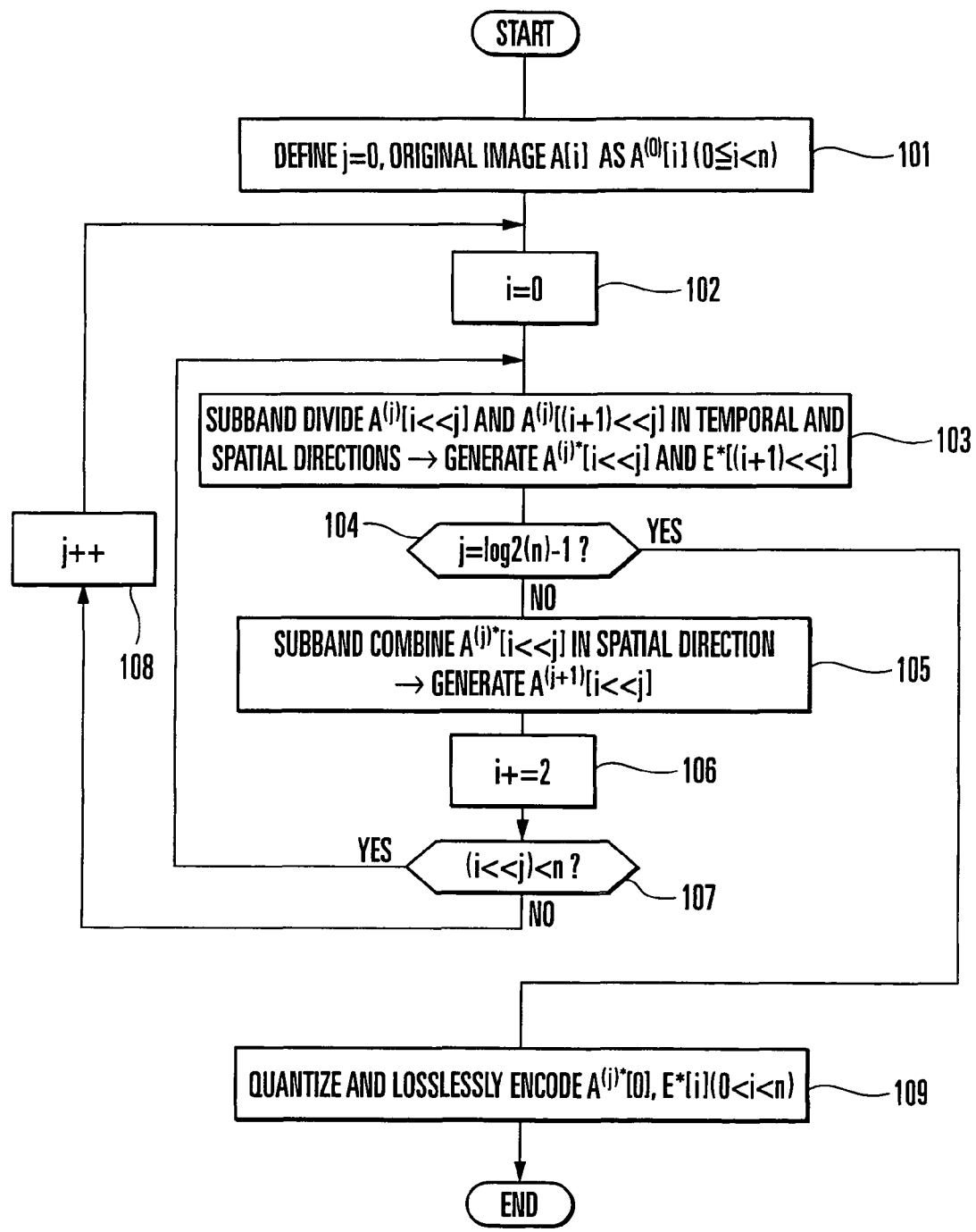
FIG. 7 is a flowchart showing the flow of processing of a moving picture encoding method according to an embodiment of the present invention.

FIG. 7 is a flowchart showing the flow of an encoding process as an embodiment of the present invention. A method of encoding a set $A(0)[i]$ ($0 \leq i < n$, n is the power of 2) of continuous image frames as an input original image will be described below with reference to FIG. 7.

First, $j=0$, and $i=0, 2, \ldots, n-2$ are set (steps 101 and 102), and two consecutive frames $A(0)[i]$ and $A(0)[i+1]$ are subband divided in both a temporal direction and spatial direction (step 103).

FIG. 8 is a flowchart showing the flow of the process of subband dividing two frames in the temporal and spatial directions in step 103 of FIG. 7. In the following description, a general process of subband dividing frames B0 and C0 in the temporal and spatial directions will be explained with reference to FIG. 8 by assuming that the frame B0 exists in the direction of past of the frame C0. First, the motion of the frame B0 with respect to the frame C0 is estimated (step 111). The motion mentioned herein is a parallel movement of each fixed-size or variable-size block forming the frame, a geometric transform such as affine transformation to each small region forming the frame, or a geometric transform such as affine transformation for the entire frame.

Then, B0 and C0 are subband divided in the temporal direction on the basis of the motion information obtained in step 111, thereby obtaining a low-frequency-band subband A0* and high-frequency-band subband E0* (step 112). As one temporal-direction subband division method, a method described in a reference [non-patent reference 3: A. Secker et. al, "Motion-compensated highly scalable video compression using an adaptive 3D wavelet transform based on lifting", IEEE Trans. Int. Conf. Image Proc., pp 1029-1032, October, 2001] will be explained below. Letting $B0[p,q]$ be the pixel value of the frame B0 in intraframe coordinates $[p,q]$, $WB0$ $(B0)[p,q]$ be the pixel value in the intraframe coordinates $[p,q]$ after the frame B0 is motion compensated on the basis of the result of the motion estimation (step 111), and $WC0(C0)$ $[p,q]$ be the pixel value in the intraframe coordinates $[p,q]$ after the frame C0 is motion compensated, $$E0*[p,q]=\tfrac{1}{2}(C0[p,q]-WB0(B0)[p,q]) \quad (1)$$

$$A0*[p,q]=B0[p,q]+WC0(E0*)[p,q] \quad (2)$$

When a filter having a filter length larger than 2 in the temporal direction is to be used as another temporal-direction subband division method, letting $fl[i]$ ($0 \leq i < nl$) and $fh[i]$ ($0 \leq i < nh$) be decomposition filters to a low-frequency band and high-frequency band, respectively, with respect to a plurality of input frames $B0i$, $A0*$ and $E0*$ are $$A0*[p,q]=\Sigma 0 \leq i < nl fl[i] \cdot WB0i(B0i)[p,q]) \quad (1)'$$

$$E0*[p,q]=\Sigma 0 \leq j < nh fh[i] \cdot WB0j(B0j)[p,q]) \quad (2)'$$

Also, when a method of reference 2 [non-patent reference 4: L. Lio et. al., "Motion Compensated Lifting Wavelet And Its Application in Video Coding", IEEE Int. Conf. Multimedia & Expo 2001, August, 2001] which performs motion compensation during the processing of each filter in a lifting method which realizes high-order subband division by superimposing primary filters is to be used, letting $B0i$ and $C0i$ be an even-numbered frame and odd-numbered frame, respectively, of a plurality of input frames, $B0'i \cdot C0'i$ multiplied by the primary filters is indicated by $$C0'i[p,q]=C0i[p,q]+\alpha(WB0i(B0i+WB0i+1(B0i+1))[p,q]) \quad (1)''$$

$$B0'i[p,q]=B0i[p,q]+\beta(WC0i(C0'i+WC0i-1(C0'i-1))[p,q]) \quad (2)''$$

by using constants $\alpha$ and $\beta$. Temporal-direction subband division using the lifting method is performed by alternately repeating the two filtering processes. In addition, it is also possible to perform processing equivalent to normal motion compensation prediction without generating any low frequency component A0*.

After being obtained, A0* and E0* are spatially subband divided once (step 113). When divide-by-2 frequency division using a one-dimensional filterbank is to be performed as subband division, four subbands are generated: a subband divided into a low-frequency band in both the horizontal and vertical directions; a subband divided into a low-frequency band in the horizontal direction and a high-frequency band in the vertical direction; a subband divided into a high-frequency band in the horizontal direction and a low-frequency band in the vertical direction; and a subband divided into a high-frequency band in both the horizontal and vertical directions. These subband transforms are defined as LL( ), LH( ), HL( ), and HH( ). Also, a set of three subbands LH(C0), HL(C0), and HH(C0) is defined as H(C0). In this manner, LL(A0*), H(A0*), LL(E0*), H(E0*) are obtained.

After that, the frames B0 and C0 are spatially subband divided by one hierarchy (step 115) to obtain LL(B0), H(B0), LL(C0), and H(C0). LL(B0) and LL(C0) are defined as B1 and C1, respectively, and B1 and C1 are subband divided in the temporal direction on the basis of the motion information obtained in step 111, thereby obtaining a low-frequency-band subband A1* and high-frequency-band subband E1* (step 116). Note that A1* is not equal to LL(A0*), and E1* is not equal to LL(E0*).

Motion compensation processes in a low-frequency band in the spatial direction include a method which performs the process on the basis of motion information which changes from one subband to another as in the second prior art, and a method which applies motion information obtained at the original resolution to a low-frequency band. In the temporal/spatial divisional filtering as the characteristic feature of the present invention, these two implementation methods take the same arrangement except for the motion compensation process. While the former uses general motion compensation even on different spatial resolutions, the latter uses specific motion compensation at different spatial resolutions, thereby simplifying signal combination in the temporal and spatial directions. In temporal combination filtering which makes a pair with the temporal/spatial divisional filtering, the former corresponds to FIG. 2, and the latter corresponds to FIG. 3.

In this embodiment, the latter method which determines a motion compensation process on the basis of motion information obtained at the original resolution will be described below. A motion compensation process for a spatial-direction, low-frequency-band subband according to this embodiment will be explained with reference to FIG. 9. From the definition of subband division, combination filters LL-1, LH-1, HL-1, and HH-1 by which LL-1(B1)+LH-1(LH(B0))+HL-1(HL(B0))+HH-1(HH(B0))=B0 exist. Filters WBLL0, WBLH0, WBHL0, and WBHH0 obtained by multiplying the above filters by WB0 in equation (1) satisfy $$WBLL0(B1)+WBLH0(LH(B0))+WBHL0(HL(B0))+WBHH0(HH(B0))=WB0(B0) \quad (3)$$

When LL(WBLL0(B1)) is defined as WB1(B1) and LL(WBLH0(LH(B0))+WBHL0(HL(B0))+WBHH0(HH(B0))) is defined as WBH0(H(B0)), $$WB1(B1)+WBH0(H(B0))=LL(WB0(B0)) \quad (4)$$

In this case, if $E1*[p,q]$ is defined as $$E1*[p,q]=\tfrac{1}{2}(C1[p,q]-WB1(B1)[p,q]) \quad (5)$$

then $$E1*[p,q]=\tfrac{1}{2}WBH0(H(B0))[p,q]=LL(E0*)[p,q] \quad (6)$$

For arbitrary k, Ak* and Ek* are defined in accordance with equations (7) to (12) in the same manner as in equations (1) to (6).

$$Ek^*[p,q] = \tfrac{1}{2} * (Ck[p,q] - WBk(Bk)[p,q]) \quad (7)$$

$$Ak^*[p,q] = Bk[p,q] + WC0(Ek^*)[p,q] \quad (8)$$

$$WBk+1(Bk+1) + WBHk+1(H(Bk)) = LL(WBk(Bk)) \quad (9)$$

$$WCk+1(Ek+1^*) + WCHk+1(H(Ek^*)) = LL(WCk(Ek^*)) \quad (10)$$

$$Ek+1^*[p,q] - \tfrac{1}{2}WBHk(H(Bk))[p,q] = LL(Ek^*)[p,q] \quad (11)$$

$$Ak+1^*[p,q] + WCHk(H(Ek^*))[p,q] = LL(Ak^*)[p,q] \quad (12)$$

Another means for applying motion information obtained at the original resolution to a spatial-direction, low-frequency-band subband is a method of reducing the motion information in accordance with the resolution. After A1* and E1* are obtained, if the subband division count in the spatial direction is 1 (step 117), A1*, H(B0), and E1* are output as the results of division instead of LL(A0*), H(A0*), and LL(E0*), respectively (step 120), and the process is completed. In other cases, A1* and E1* are spatially subband divided once to obtain L(A1*), H(A1*), L(E1*), and H(E1*) (step 118). After that, B1 and C1 are subband divided once (step 115), and obtained B2 and C2 are subband divided in the temporal direction (step 116). The above processing is performed until the division count becomes m (step 117). Obtained L(Am*) H(Bk), L(Em*), and H(Ek*) (0≦k<m) are output as the results of division (step 120), and the process is completed.

The foregoing is the explanation of step 103. Referring back to FIG. 7, the encoding process of the present invention will be explained below.

After step 103, A(0)*[0] as temporal-direction, low-frequency-band subbands are combined in the spatial direction to generate A(1)[0] (step 105). This step is performed to subband divide A(1)[0] in the temporal and spatial directions again in step S103 in an upper temporal-direction hierarchy.

After the processes in steps 103 and 105 are performed for A(0)[n−2] and A(0)[n−1] (steps 106 and 107), 1 is added to j (step 108) to set i=0, 2, ..., n/2−2, thereby subband dividing A(1)[i<<1] and A(1)[(i+1)<<1] in the temporal and spatial directions (step 103), and subband combining A(1)*[i<<1] in the spatial direction (step 105). This process loop is performed until j becomes equal to log 2(n)−1. If the current division count in the temporal direction is equal to log 2(n)−1 at the end of step 103 (step 104), this means that all signals are completely subband divided in the temporal and spatial directions. The encoding process then quantizes and losslessly encodes obtained signals A(j)*[0] and E*[i] (0<i<n). As the quantization, it is possible to use linear quantization, nonlinear quantization, vector quantization, or bit plane quantization used in JPEG 2000 which is an international standard still picture coding. Also, as the lossless encoding, it is possible to use zerotree coding described in reference 3 [non-patent reference 5: J. M. Shapiro, "Embedded image coding using zerotrees of wavelets coefficients", IEEE Trans. Signal Processing, vol. 41, pp. 3445-3462, December 1993], arithmetic coding, or run length coding. In this way, the process of encoding A(0)[k] (0≦k<n) is completed.

Note that this embodiment takes the flow of processing by which after subband division is performed in a certain hierarchy in both the temporal and spatial directions, frames to be encoded in the next hierarchy are subband combined once in the spatial direction. However, these two processes can be integrated by, e.g., correcting high-frequency components of subband signals once in the spatial direction on occasion by motion compensation. One characteristic feature of the present invention is to appropriately correct motion compensation in accordance with a frequency band in the spatial direction, so the order of the spatial-direction subband dividing processes does not degrade the novelty of the present invention.

The moving picture encoding device which implements this embodiment will be explained below with reference to FIGS. 10 to 12. FIG. 10 is a block diagram showing the arrangement of the moving picture encoding device.

An input image signal 2000 is frequency divided in the temporal and spatial directions by a temporal/spatial divisional filtering unit 200, thereby generating a temporal low-frequency divided signal 2001 and temporal high-frequency divided signal 2002. The temporal low-frequency divided signal 2001 and temporal high-frequency divided signal 2002 are encoded by a texture signal encoder 201 to generate encoded data 2003.

Figure 11:
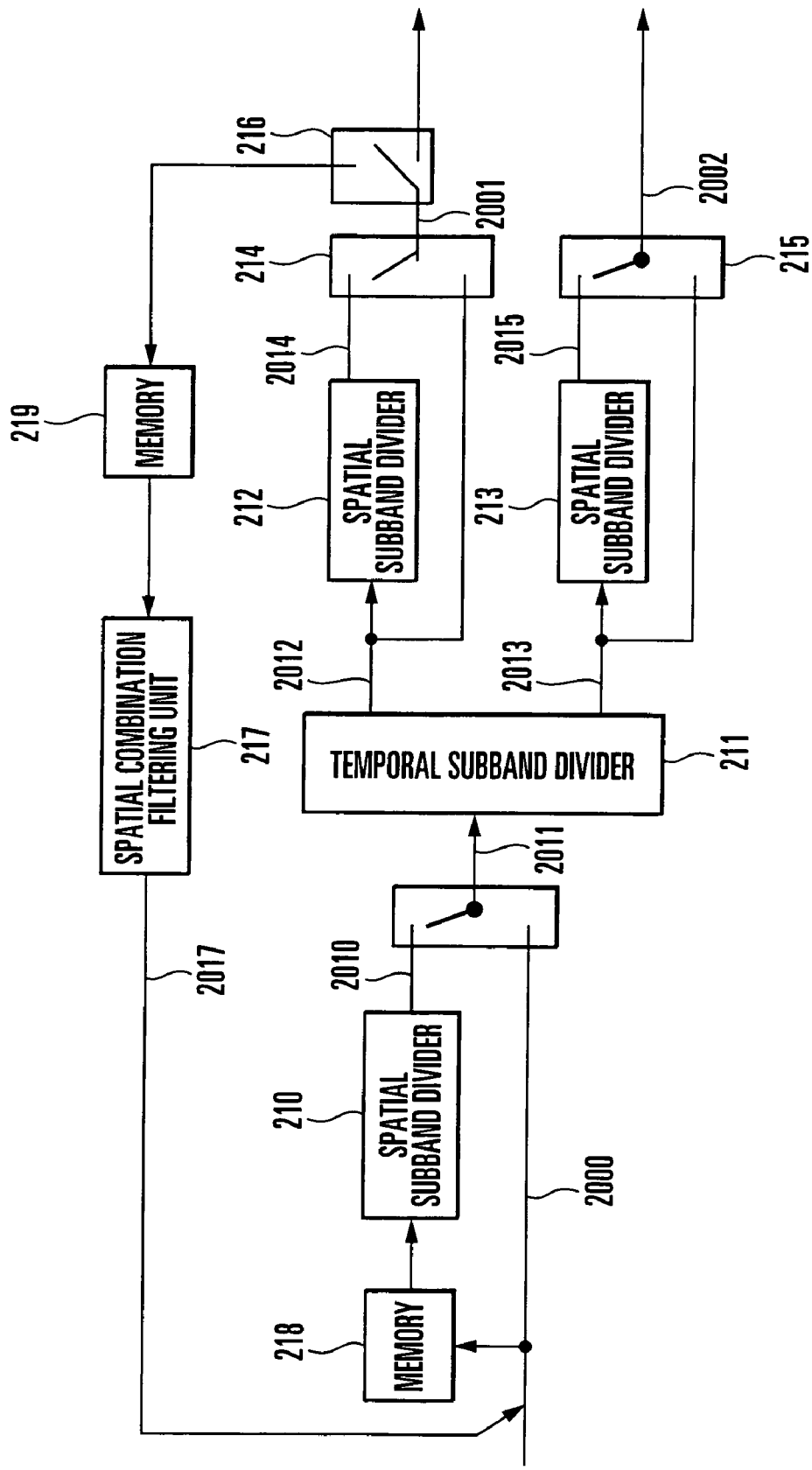
FIG. 11 is a block diagram showing the arrangement of a temporal/spatial divisional filtering unit.

FIG. 11 is a block diagram showing the arrangement of the temporal/spatial divisional filtering unit. First, the input image signal 2000 is stored in a memory 218. A temporal-direction filtering unit 211 temporally hierarchizes the input image signal 2000 to generate a temporal low-frequency signal 2012 and temporal high-frequency signal 2013. A spatial subband divider 212 performs a high-frequency signal generation process on the temporal low-frequency signal 2012 to generate a temporal low-frequency/spatial high-frequency signal 2014. Also, a spatial subband divider 213 performs a high-frequency signal generation process on the temporal high-frequency signal 2013 to generate a temporal high-frequency/spatial high-frequency signal 2015. The temporal high-frequency/spatial high-frequency signal 2015 is output as the temporal high-frequency divided signal 2002, and the temporal low-frequency/spatial high-frequency signal 2014 is stored in a memory 219.

A spatial subband divider 210 performs a low-frequency signal generation process on the input image signal stored in the memory 218, thereby generating a reduce image signal 2010. The temporal-direction filtering unit 21 temporally hierarchizes the reduced image signal 2010 to generate a temporal low-frequency signal 2012 and temporal high-frequency signal 2013. The spatial subband dividers 212 and 213 perform a high-frequency signal generation process on the temporal low-frequency signal 2012 and temporal high-frequency signal 2013 to generate a temporal low-frequency/spatial high-frequency signal 2014 and temporal high-frequency/spatial high-frequency signal 2015, respectively. The temporal high-frequency/spatial high-frequency signal 2015 is output as the temporal high-frequency signal 2002, and the temporal low-frequency/spatial high-frequency signal 2014 is stored in the memory 219. If a spatial hierarchical divide-by number is m, after the same processing is performed (m−1) times, switches 214 and 215 regard the temporal low-frequency signal 2012 and temporal high-frequency signal 2013 as the temporal low-frequency divided signal 2001 and temporal high-frequency divided signal 2002, respectively, when the mth division is performed. After that, a spatial combination filtering unit 217 combines the temporal low-frequency divided signals stored in the memory 219 to generate a temporal low-frequency signal 2017. The temporal/spatial divisional filtering unit recurrently performs the temporal/spatial divisional filtering described above by regarding the temporal low-frequency signal 2017 as an input. If a temporal-direction divide-by number is n0, after the same processing is performed n0−1 times, a switch 216 outputs a temporal low-frequency divided signal 2001 without storing it in the memory 219 after the (n0)th division.

Figure 12:
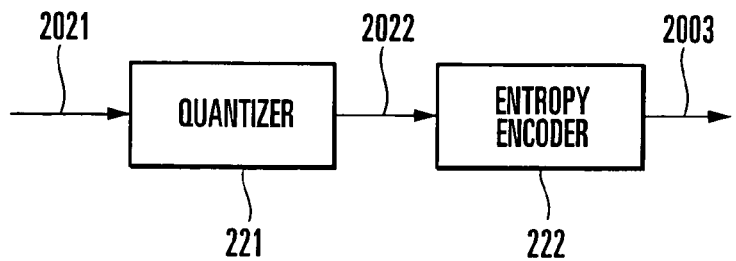
FIG. 12 is a block diagram showing the arrangement of a texture signal encoder.

FIG. 12 is a block diagram showing the arrangement of the texture signal encoder. The temporal low-frequency divided signal 2001 and temporal high-frequency divided signal 2002 will be collectively referred to as a division result signal 2021. The division result signal 2021 is quantized and output as a quantized coefficient signal 2022 by a quantizer 221. The quantized coefficient signal 2022 is entropy encoded and output as encoded data 2003 by an entropy encoder 222. Note that the quantizer 221 is omitted in some cases. Note also that a frequency conversion process is sometimes added before the quantizer 221.

Note that step 105 in FIG. 7 corresponds to the processing of the spatial combination filtering unit 217 in FIG. 11, and step 103 in FIG. 7 corresponds to the processing, except for the spatial combination filtering unit 217, of the temporal/spatial divisional filtering unit shown in FIG. 11. Steps 104 and 107 in FIG. 7 correspond to the processing of the switch 216 in FIG. 11, and step 109 in FIG. 7 corresponds to the processing of the texture signal encoder 201 in FIG. 10.

Note also that steps 111, 112, and 116 in FIG. 8 correspond to the processing of the temporal-direction filtering 211 in FIG. 11, step 115 in FIG. 8 corresponds to the spatial subband divider 210 in FIG. 11, and steps 113 and 118 in FIG. 8 correspond to the processing of the spatial subband dividers 212 and 213 in FIG. 11. Step 117 in FIG. 8 corresponds to the processing of the switches 214 and 215 in FIG. 11.

A decoding process in the encoding method of the present invention will be explained below.

The arrangement of a temporal/spatial divisional filtering unit which implements temporal/spatial combination filtering in the moving picture decoding method as the characteristic feature of the present invention will be described below with reference to FIG. 13.

Figure 13:
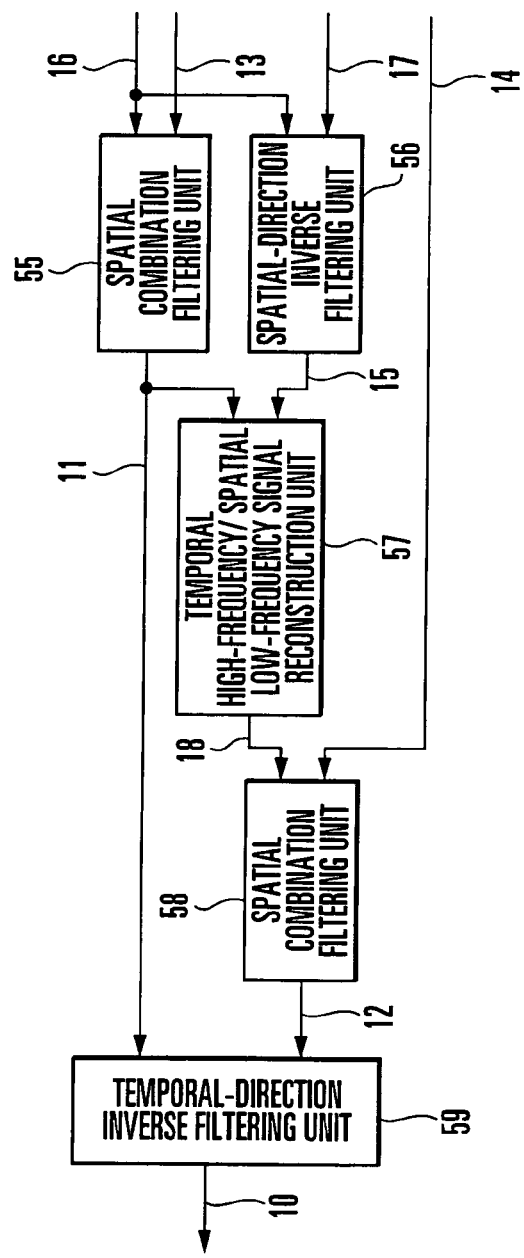
FIG. 13 is a block diagram showing the arrangement of a temporal/spatial divisional filtering unit which implements temporal/spatial combination filtering in a moving picture decoding method as the characteristic feature of the present invention.

Referring to FIG. 13, the temporal/spatial combination filtering unit comprises a spatial combination filtering unit 55, temporal-direction inverse filtering unit 56, temporal high-frequency/spatial low-frequency signal reconstruction unit 57, spatial combination filtering unit 58, and temporal-direction inverse filtering unit 59. Note that the moving picture signal 10, temporal low-frequency signal 11, temporal high-frequency signal 12, temporal low-frequency/spatial high-frequency signal 13, temporal high-frequency/spatial high-frequency signal 14, reduced image signal 15, temporal low-frequency signal 16, temporal high-frequency signal 17, and temporal high-frequency/spatial low-frequency signal 18 in FIG. 2 correspond to a moving picture signal 10, temporal low-frequency signal 11, temporal high-frequency signal 12, temporal low-frequency/spatial high-frequency signal 13, temporal high-frequency/spatial high-frequency signal 14, reduced image signal 15, temporal low-frequency signal 16, temporal high-frequency signal 17, and temporal high-frequency/spatial low-frequency signal 18, respectively, in FIG. 13.

The processing of the temporal/spatial combination filtering shown in FIG. 13 will be explained below with reference to a flowchart in FIG. 14.

First, the spatial combination filtering unit 55 spatially hierarchically combines a temporal low-frequency signal 16 and temporal low-frequency/spatial high-frequency signal 13 to generate a temporal low-frequency signal 11 (step 84). Also, the temporal-direction inverse filtering unit 56 temporally hierarchically combines the temporal low-frequency signal 16 and a temporal high-frequency signal 17 to reconstruct a reduced image signal 15 (step 85). The temporal high-frequency/spatial low-frequency signal reconstruction unit 57 reconstructs a temporal high-frequency/spatial low-frequency signal 18 by referring to the temporal low-frequency signal 11 and reduced image signal 15 (step 86). The spatial combination filtering unit 58 spatially hierarchically combines the temporal high-frequency/spatial low-frequency signal 18 and a temporal high-frequency/spatial high-frequency signal 14 (step 87), thereby reconstructing a temporal high-frequency signal 12. The temporal-direction inverse filtering unit 59 temporally hierarchically combines the temporal low-frequency signal 11 and temporal high-frequency signal 12 to reconstruct a moving picture signal 10 (step 88).

The characteristic feature of the temporal/spatial combination filtering is the process of reconstructing a temporal high-frequency/spatial low-frequency signal. FIG. 15 is a conceptual view for explaining this process. Symbols representing signals in FIG. 15 comply with those shown in FIG. 9. B0 and B1 represent the temporal low-frequency signals 11 and 16, respectively, shown in FIG. 14, E0* and E1* represent the temporal high-frequency signals 12 and 17, respectively, and H(E0*) represents the temporal high-frequency/spatial high-frequency signal 14. Also, C0 represents the moving picture signal 10 corresponding to E0*, and C1 represents the reduced image signal 15 corresponding to E1*. WB0 and WB1 are motion compensation operators for B0 and B1, respectively. Assume that the temporal high-frequency signal E0* is obtained by performing temporal-direction filtering on prediction image signals P0 and C0 obtained by motion compensating B0 in encoding. That is, letting f be the operator of temporal-direction filtering, $$E0^* = f(P0, C0) \tag{13}$$

Figure 14:
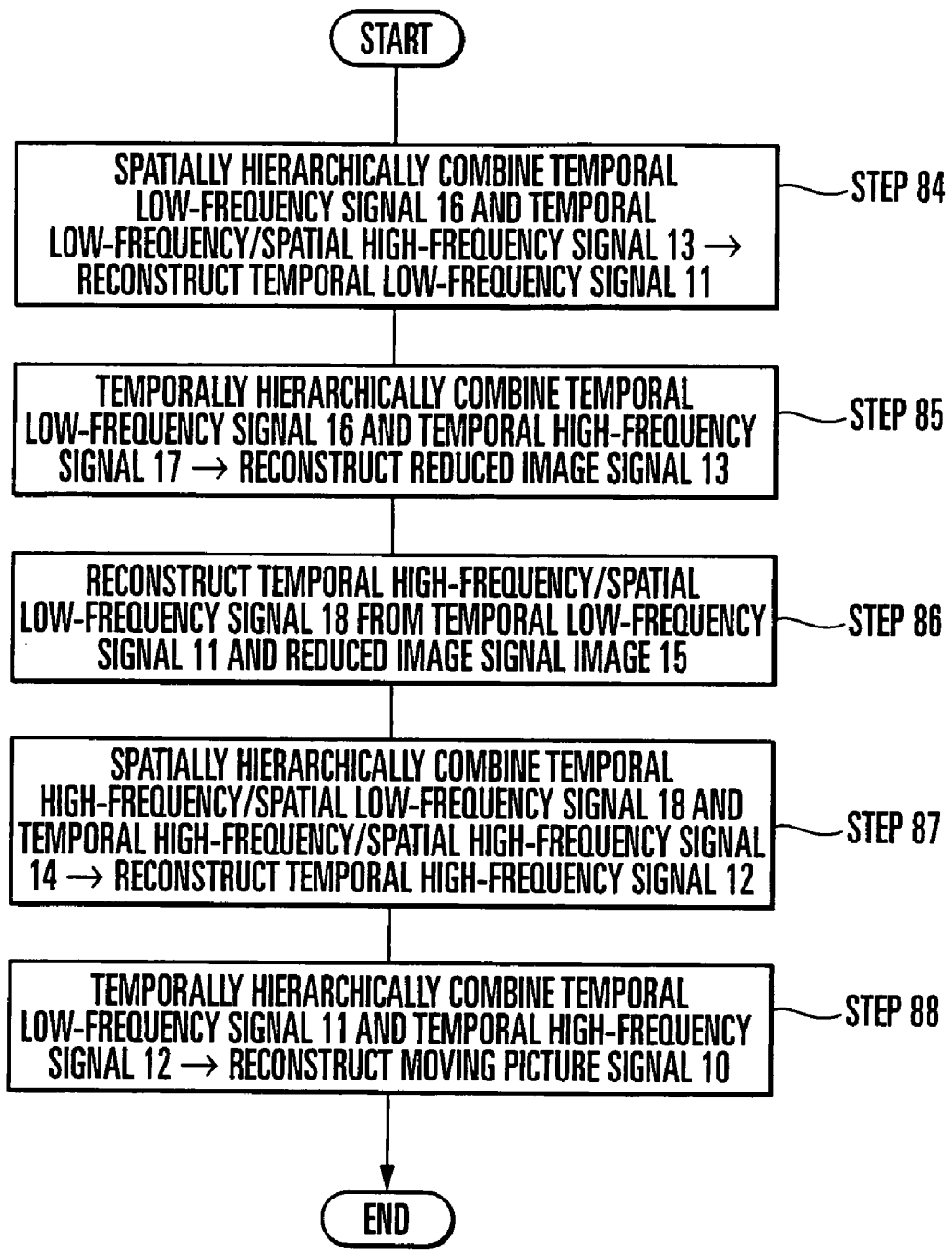
FIG. 14 is a flowchart showing the flow of processing of the temporal/spatial combination filtering.
Figure 15:
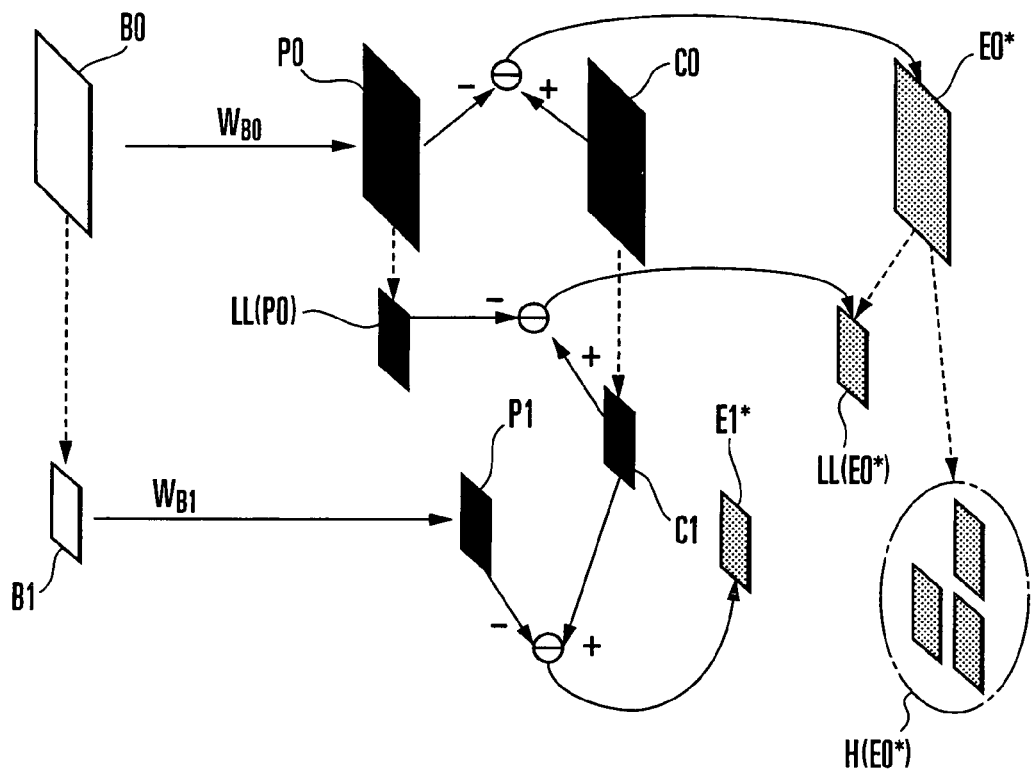
FIG. 15 is a conceptual view for explaining the process of reconstructing a temporal high-frequency/spatial low-frequency signal as the characteristic feature of the temporal/spatial combination filtering.

Assume also that B0 and C1 are reconstructed by steps 90 and 91, respectively, shown in FIG. 14. From equation (13), a temporal high-frequency/spatial low-frequency signal LL(E0*) is obtained by $$LL(E0^*) = f(LL(P0), C1) \tag{14}$$

Figure 2:
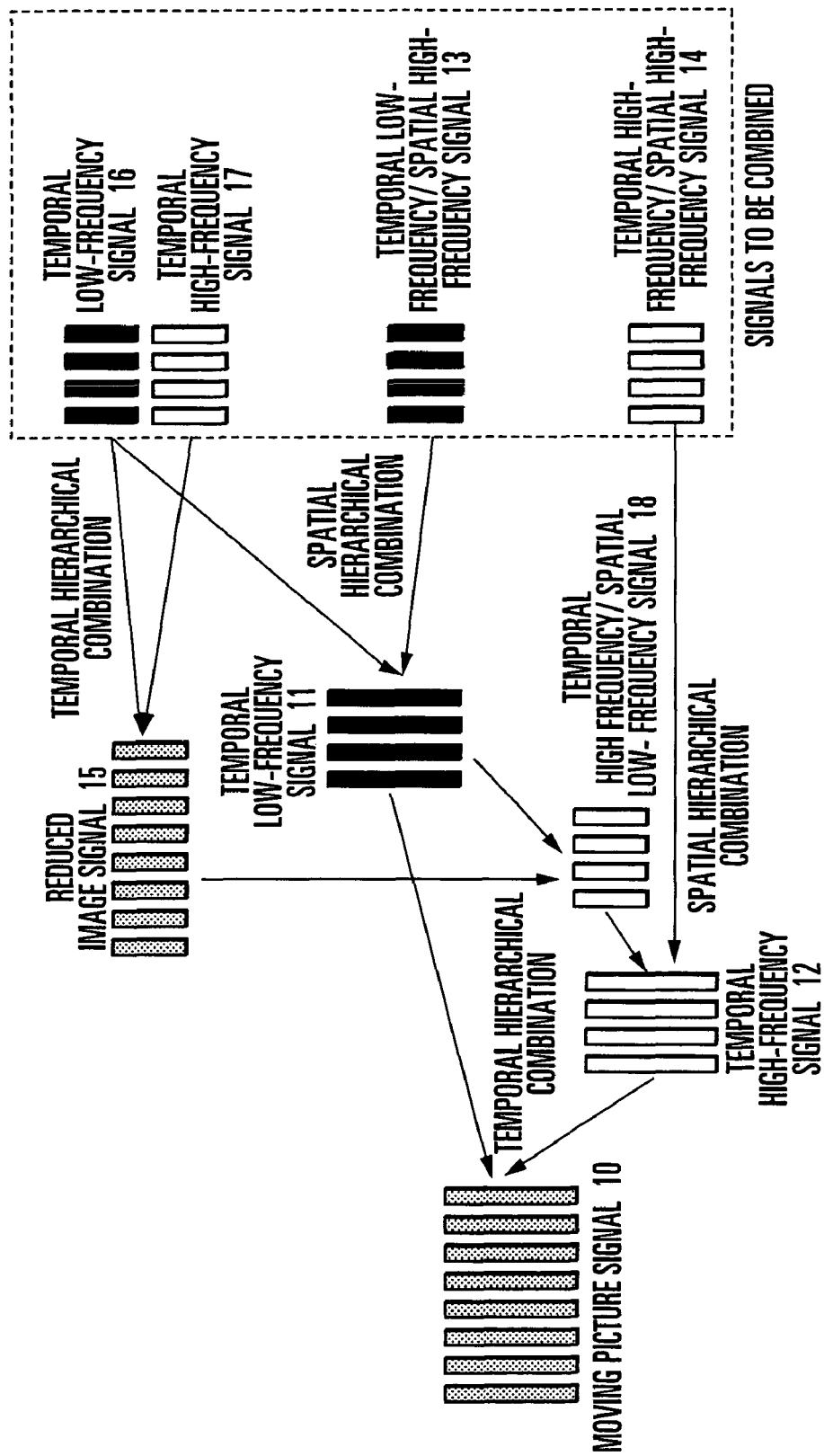
FIG. 2 is a conceptual view for explaining an outline of temporal/spatial combination filtering in moving picture decoding as the characteristic feature of the present invention.
Figure 3:
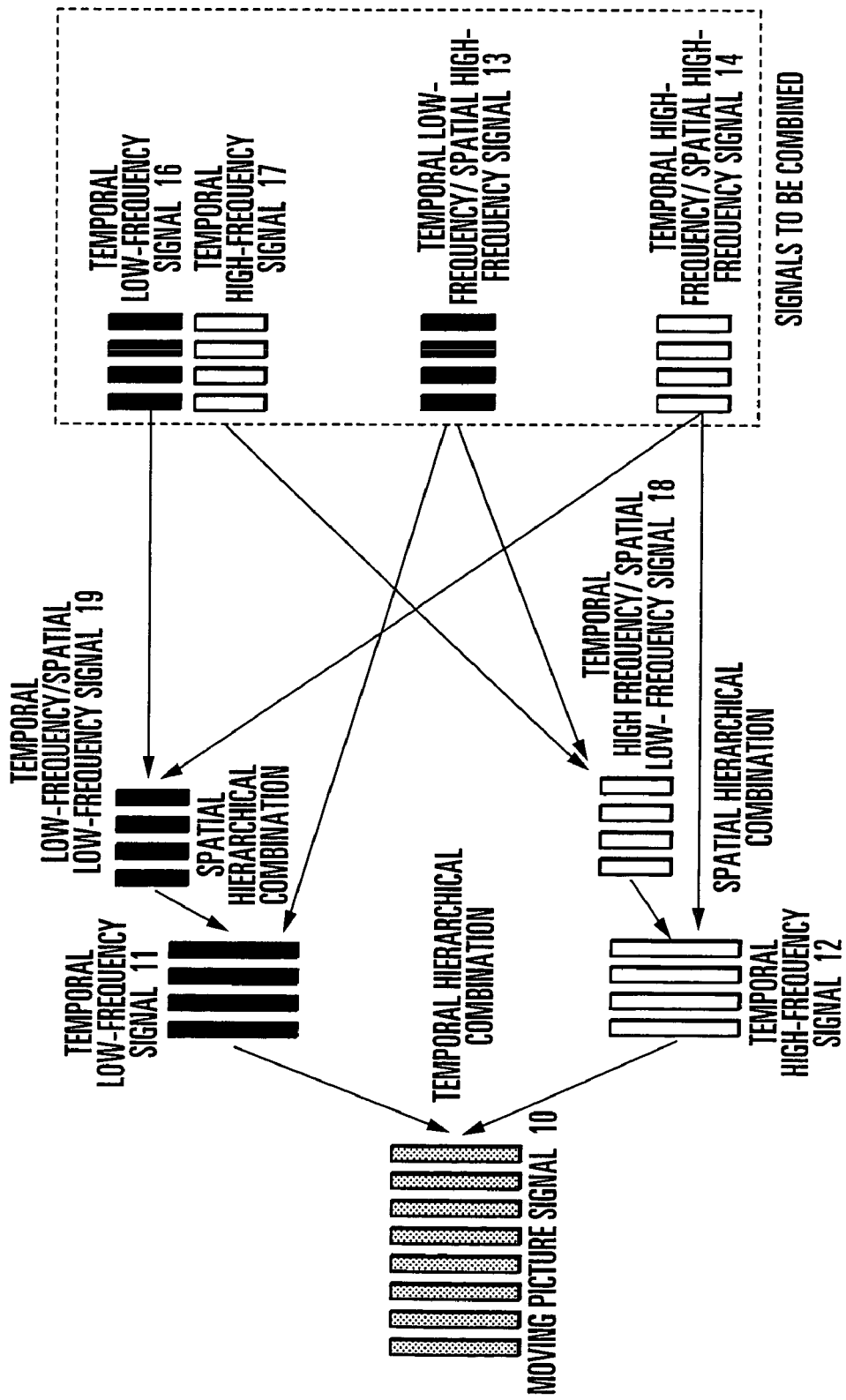
FIG. 3 is a conceptual view for explaining simplified temporal/spatial combination filtering as the characteristic feature of the present invention.

The temporal/spatial combination filtering in the moving picture decoding method as an embodiment of the present invention is the method shown in FIG. 3 by which a motion compensation process is defined and simplified for each spatial hierarchy in the temporal/spatial combination filtering shown in FIG. 2. The arrangement of a temporal/spatial combination filtering unit which implements the temporal/spatial combination filtering as an embodiment of the present invention will be explained below with reference to FIG. 16.

Figure 16:
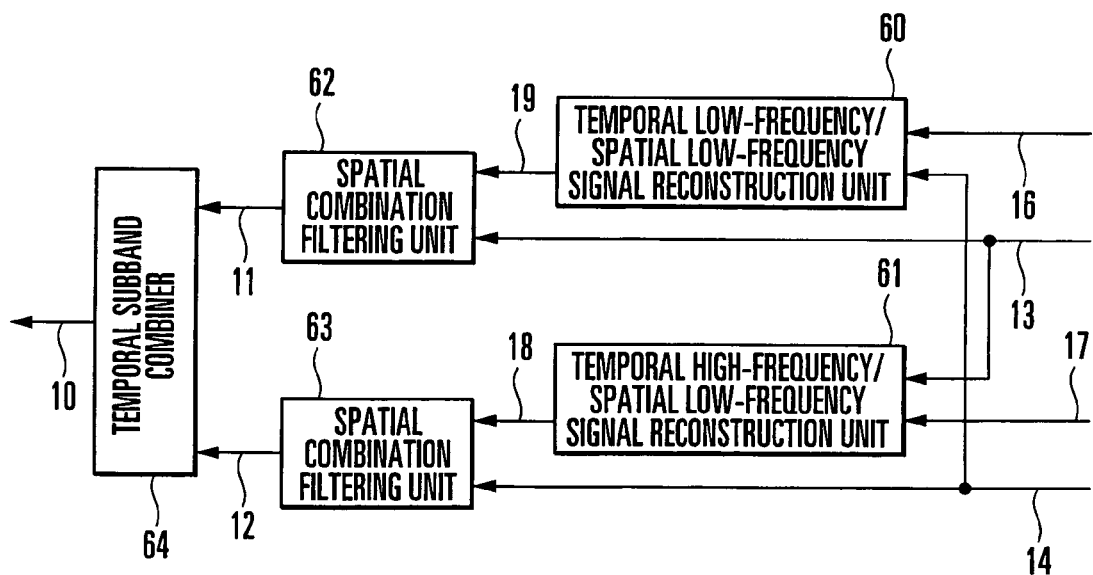
FIG. 16 is a view showing the arrangement of a temporal/spatial divisional filtering unit which implements temporal/spatial combination filtering according to an embodiment of the present invention.

Referring to FIG. 16, the temporal/spatial combination filtering unit comprises a temporal low-frequency/spatial low-frequency signal reconstruction unit 60, temporal high-frequency/spatial low-frequency signal reconstruction unit 61, spatial combination filtering unit 62, spatial combination filtering unit 63, and temporal-direction inverse filtering 64. Note that the moving picture signal 10, temporal low-frequency signal 11, temporal high-frequency signal 12, temporal low-frequency/spatial high-frequency signal 13, temporal high-frequency/spatial high-frequency signal 14, reduced image signal 15, temporal low-frequency signal 16, temporal high-frequency signal 17, temporal high-frequency/spatial low-frequency signal 18, and temporal low-frequency/spatial low-frequency signal 19 in FIG. 3 correspond to a moving picture signal 10, temporal low-frequency signal 11, temporal high-frequency signal 12, temporal low-frequency/spatial high-frequency signal 13, temporal high-frequency/spatial high-frequency signal 14, reduced image signal 15, temporal low-frequency signal 16, temporal high-frequency signal 17, temporal high-frequency/spatial low-frequency signal 18, and temporal low-frequency/spatial low-frequency signal 19, respectively, in FIG. 16.

Figure 17:
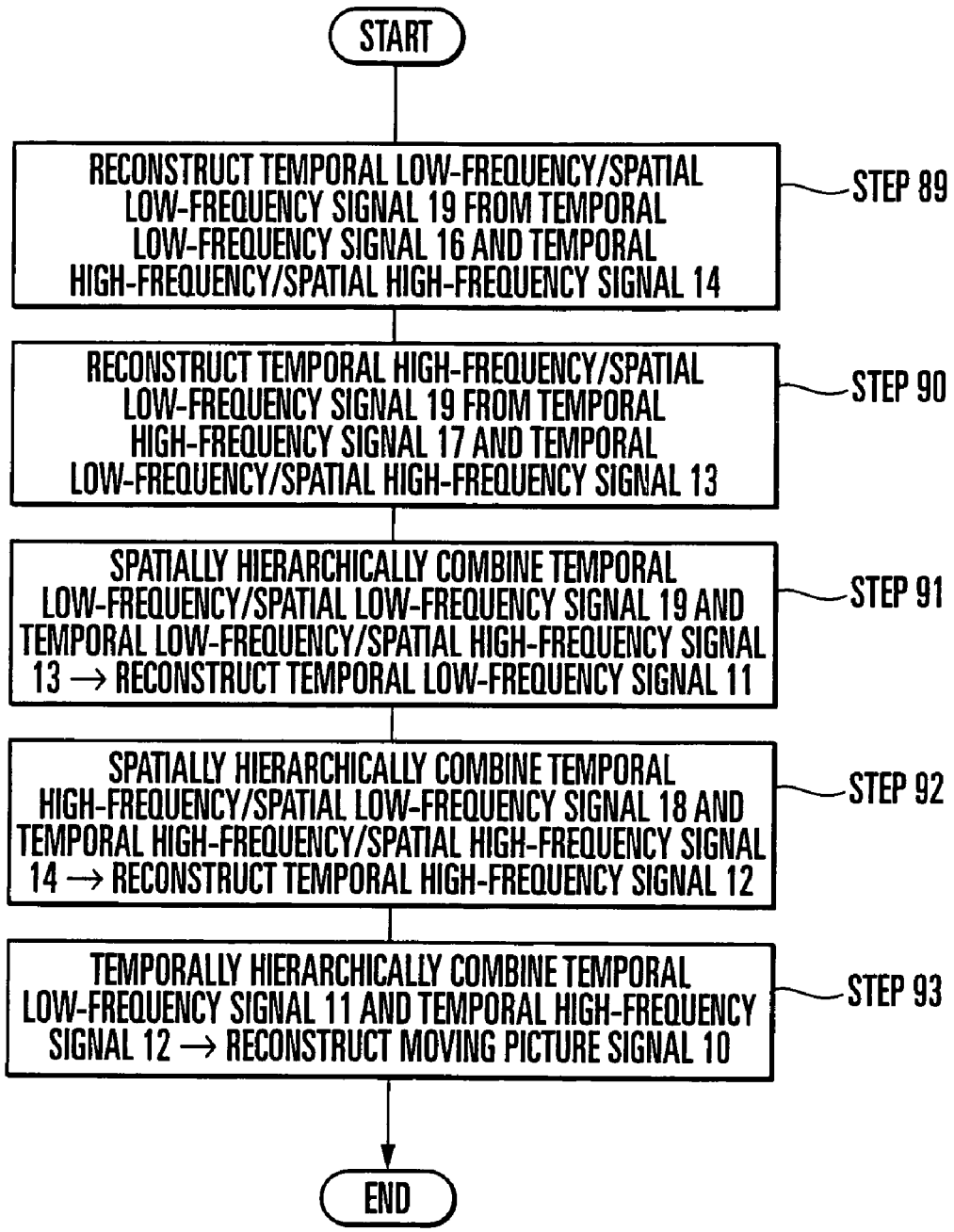
FIG. 17 is a flowchart showing the flow of processing of the temporal/spatial combination filtering.

The process of the temporal/spatial combination filtering shown in FIG. 16 will be explained below with reference to a flowchart in FIG. 17.

First, the temporal low-frequency/spatial low-frequency signal reconstruction unit 60 reconstructs a temporal low-frequency/spatial low-frequency signal 19 by referring to a temporal low-frequency signal 16 and temporal high-frequency/spatial high-frequency signal 14 (step 89). Also, the temporal high-frequency/spatial low-frequency signal reconstruction unit 61 reconstructs a temporal high-frequency/spatial high-frequency signal 18 by referring to a temporal high-frequency signal 17 and temporal low-frequency/spatial high-frequency signal (step 90). The spatial combination filtering unit 62 reconstructs a temporal low-frequency signal 11 by spatially hierarchically combining the temporal low-frequency/spatial low-frequency signal 19 and a temporal low-frequency/spatial high-frequency signal 13 (step 91), and the spatial combination filtering unit 63 reconstructs a temporal low-frequency signal 12 by spatially hierarchically combining the temporal low-frequency/spatial low-frequency signal 18 and temporal low-frequency/spatial high-frequency signal 14 (step 92). The temporal-direction inverse filtering unit 64 reconstructs a moving picture signal 10 by temporally hierarchically combining the temporal low-frequency signal 11 and temporal high-frequency signal 12 (step 93).

The moving picture decoding method having the temporal/spatial combination filtering will be explained below with reference to FIGS. 18 and 19.

In this embodiment, a decoded image has an arbitrary resolution which is 1/the power of 2 in both the temporal and spatial directions with respect to the original image. That is, when a spatial-direction subband divide-by number is m in the encoding process, it is possible to reconstruct a decoded image having a resolution of ½, ¼, . . . , ½m that of the original image in the horizontal and vertical directions. Also, a decoded image having a frame rate of ½, ¼, . . . , ½n0 that of the original image can be reconstructed with respect to temporal-direction subband divide-by number n0=log 2(n). FIG. 18 is a flowchart showing the flow of the decoding process as an embodiment of the present invention. A process of reconstructing a decoded image A(j0)k0[i] having a resolution of ½k0 (0≦k0≦m) in the horizontal and vertical directions and a frame rate of ½j0 (0≦j0≦n0) with respect to an original image A(0)[i] (0≦i<n, n is the power of 2) will be described below with reference to FIG. 18.

First, an inverse of lossless encoding and inverse quantization are performed on encoded data (step 152). Signals obtained by this processing are defined as A(n0)*[0] and E*[i] (0<i<n) in accordance with the symbols used in FIG. 7. Then, whether j0 and n0 are equal is checked (step 153). If j0 and n0 are equal, no subband combination in the temporal direction need be performed, so A(j)*[0] is subband combined in the spatial direction by k0 hierarchies. When A(j0)k0[0] is reconstructed (step 154), the decoding process is completed. On the other hand, if j0 and n0 are not equal, A(j)*[0] and E*[n/2] are subband combined in both the temporal and spatial directions (steps 155 and 156).

Figure 19:
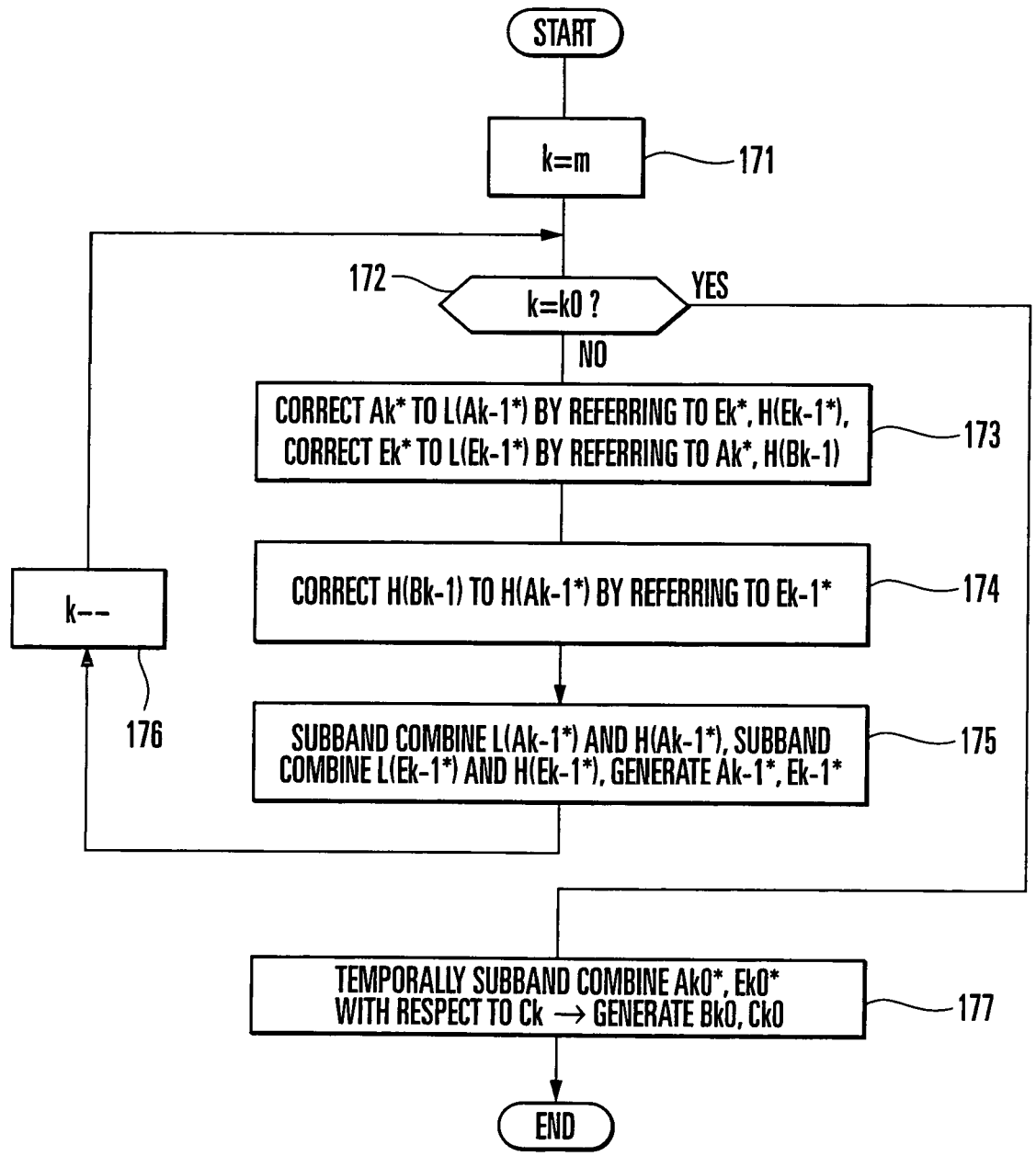
FIG. 19 is a flowchart showing the flow of a temporal/spatial subband combination process for two frames shown in FIG. 18.

FIG. 19 is a flowchart showing the flow of the process of subband combining two frame data in the temporal and spatial directions in step 156. Assume that the number of times of subband combination is k0 during decoding. If k0 is zero, a decoded image having the same resolution as the original image is obtained; if k0 is positive, a decoded image having a resolution reduced by the (k0)th power of 2 is obtained. Data of the two frames as objects of the subband combining process takes a hierarchical structure which is subband divided m times in the spatial direction. In accordance with steps 116 and 118 in FIG. 8, of subband signals belonging to a low-frequency band in temporal-direction subband division, a subband signal belonging to the lowest-frequency band in spatial-direction subband division corresponds to Am*, and a high-frequency-band subband after the kth hierarchy is subband divided corresponds to H(Bk) (0≦k<m). Likewise, signals after subband signals belonging to a high-frequency band in temporal-direction subband division are divided in the spatial direction can be related to Em* and H(Ek*) (0≦k<m). A process of reconstructing decoded images Bk0 and Ck0 having a resolution obtained by reducing original images B0 and C0 by the (k0)th power of 2 by referring to Am*, H(Bk), Em*, and (Ek*) (0≦k<m) will be explained with reference to FIG. 19.

If k0 and m are equal (steps 171 and 172), Bm and Cm are obtained by subband combining Am* and Em* in the temporal direction (step 177). When temporal-direction subband division indicated by equations (7) and (8) is performed, subband combination is performed by $$Bm[p,q]=Am^*[p,q]+WCm(Em^*)[p,q] \qquad (15)$$

$$Cm[p,q]=2^*Em^*[p,q]+WBm(Bm)[p,q] \qquad (16)$$

where WBm and WCm are a filter representing motion compensation from Bm to Cm and a filter representing motion compensation from Cm to Bm, respectively, and the same as in the encoding process.

If k0 and m are not equal (step 172), LL(Am−1*), LL(Em−1*), and H(Am−1*) must be obtained to perform subband combination once. Therefore, k=m is set (step 171), Ak* is corrected to LL(Ak−1*) by referring to Ek* and H(Ek−1*) and Ek* is corrected to LL(Ek−1*) by referring to Ak* and H(Bk−1) (step 173), and H(Bk−1) is corrected to H(Am−1*) by referring to LL(Ek−1*) and H(Ek−1*) (step 174). These correction processes are uniquely determined from the motion compensation processes in the temporal subband division in step 114 of FIG. 8 and in the temporal subband combination in step 177 of FIG. 19. When temporal-direction subband division is performed in accordance with equations (7) to (10), Ak* is corrected to L(Ak−1*) by referring to H(Ek−1*), and Ek* is corrected to L(Ek−1*) by referring to H(Bk−1), in accordance with equations (11) and (12). Also, H(Bk−1) is corrected to H(Am−1*) by referring to Ek−1* from equation (8).

After that, L(Ak−1*) and H(Ak−1*) are subband combined, and L(Ek−1*) and H(Ek−1*) are subband combined, thereby obtaining Ak−1* and Ek−1*, respectively (step 175). When subbands Ak0* and Ek0* corresponding to the hierarchy k0 are obtained by repeating the processes from steps 173 to 175 (steps 176 and 172), temporal-direction subband combination is performed to obtain Bk0 and Ck0 (step 177). The foregoing is the explanation of the temporal/spatial-direction subband combination in step 156 of FIG. 18.

Note that the subband correction (steps 173 and 174) and the spatial-direction subband combination (step 175) are explained as independent steps in this embodiment, but these steps may also be integrated by using a filter obtained by multiplying the motion compensation filter for subband correction by the subband combination filter.

Referring back to FIG. 18, the decoding process will be explained below. After A(j)*[0] and E*[n/2] are subband combined, images A(j)(k0)[0] and A(j)(k0)[n/2] having a resolution which is ½k0 that of the original image are obtained. If j0 and n0−1 are equal (step 157), the decoding process is terminated. If not, j0 and n0−1 are subband divided k0 times in the spatial direction to obtain A(j−1)*(k0)[0] and A(j−1)*(k0)[n/2]. This division is performed because high-frequency-band subbands are necessary to correct their spatial-direction, low-frequency-band subbands in the next temporal-direction subband combination. Temporal/spatial subband combination in the next hierarchy obtained by subtracting 1 from j (step 162) is performed on A(j)*[0] and E*[n/4], and on A(j)*[n/2] and E*[3n/4] (steps 156, 159, and 160). Subband combination is repeated as described above, and the decoding process is terminated when j and j0 become equal (step 161).

Figure 20:
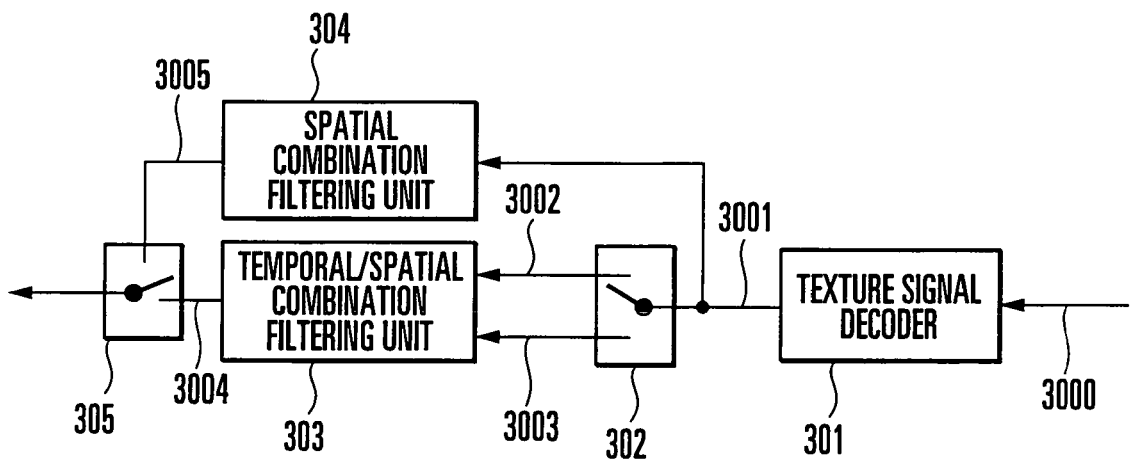
FIG. 20 is a block diagram showing the arrangement of a moving picture decoding device according to an embodiment of the present invention.

A moving picture decoding device which implements this embodiment will be described below with reference to FIGS. 20 to 24. FIG. 20 is a block diagram showing the arrangement of the moving picture decoding device.

Referring to FIG. 20, the moving picture decoding device comprises a texture signal decoder 301, switch 302, temporal/spatial combination filtering unit 303, spatial combination filtering unit 304, and switch 305. Encoded data 3000 is decoded into a division result signal 3001 by the texture signal decoder 301. The switch 305 outputs, as a decoded image, the result of a spatial hierarchical combining process performed on the division result signal 3001 by the spatial combination filtering unit 304, or outputs, as a decoded image 3004, the result of temporal/spatial combination filtering performed by the temporal/spatial combination filtering unit 303 on a temporal low-frequency divided signal 3002 or temporal high-frequency divided signal 3003 selected by the switch 302.

Figure 21:
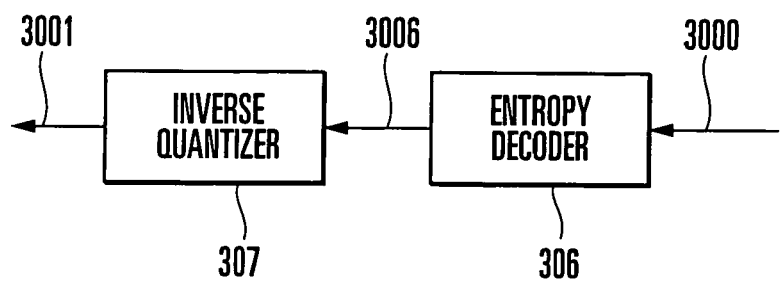
FIG. 21 is a block diagram showing the arrangement of a texture signal decoder.

FIG. 21 is a block diagram showing the arrangement of the texture signal decoder. The encoded data 3000 is decoded and output as a quantized coefficient signal 3006 by an entropy decoder 306. An inverse quantizer 307 inversely quantizes the quantized coefficient signal 3007 to reconstruct the division result signal 3001. Note that the inverse quantizer 307 is omitted in some cases in accordance with the encoding process. Note also that an inverse frequency conversion process is sometimes added after the inverse quantizer 307.

Figure 22:
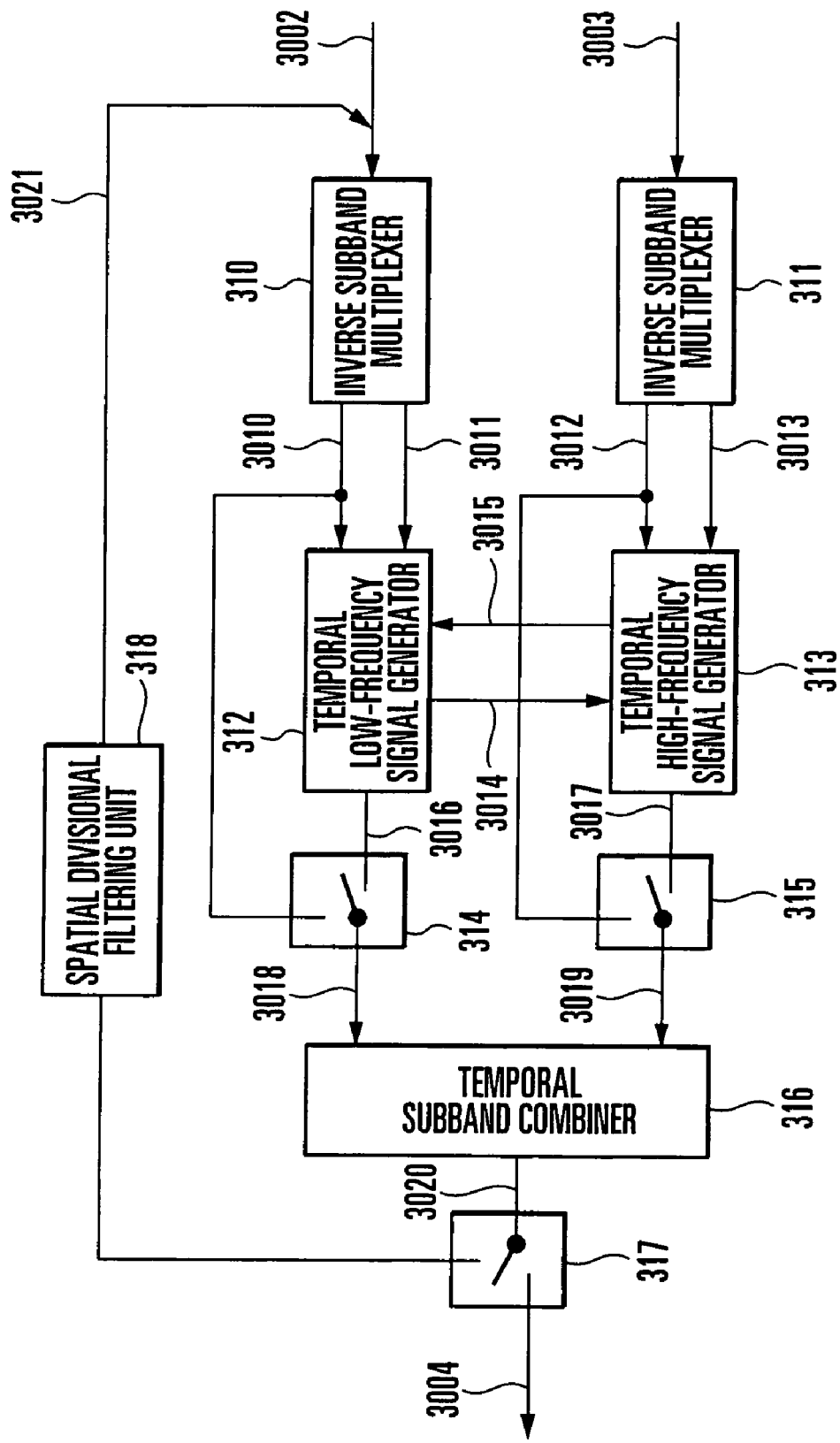
FIG. 22 is a block diagram showing the arrangement of a temporal/spatial combination filtering unit.

FIG. 22 is a block diagram showing the arrangement of the temporal/spatial combination filtering unit. The temporal low-frequency divided signal 3002 is a signal obtained by multiplexing a temporal low-frequency signal 3010 and temporal low-frequency/spatial high-frequency signal 3011, and the temporal high-frequency divided signal 3003 is a signal obtained by multiplexing a temporal high-frequency signal 3012 and temporal high-frequency/spatial high-frequency signal 3013.

An inverse subband multiplexer 310 inversely multiplexes the temporal low-frequency divided signal 3002, and outputs the temporal low-frequency signal 3010 and temporal low-frequency/spatial high-frequency signal 3011 to a temporal low-frequency signal generator 312 on occasion. An inverse subband multiplexer 311 inversely multiplexes the temporal high-frequency divided signal 3003, and outputs the temporal high-frequency signal 3012 and temporal high-frequency/spatial high-frequency signal 3013 to a temporal high-frequency signal generator 313 on occasion.

Figure 23:
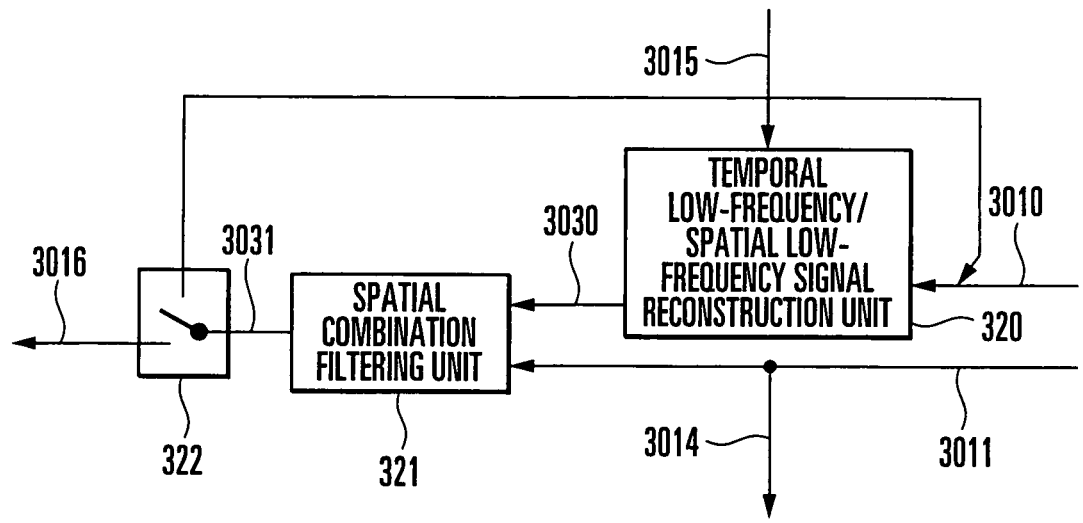
FIG. 23 is a block diagram showing the arrangement of a temporal low-frequency signal generator.

FIG. 23 is a block diagram showing the arrangement of the temporal low-frequency signal generator. A temporal low-frequency/spatial low-frequency signal reconstruction unit 320 reconstructs a temporal low-frequency/spatial low-frequency signal 3030 by referring to an auxiliary signal 3015 output from the temporal high-frequency signal generator and the temporal low-frequency signal 3010. A spatial combination filtering unit 321 spatially hierarchically combines the temporal low-frequency/spatial low-frequency signal 3030 and temporal low-frequency/spatial high-frequency signal 3011 to generate a temporal low-frequency signal 3031. A switch 322 directly outputs the temporal low-frequency signal 3031, or recurrently performs a temporal low-frequency signal generation process as an input to the temporal high-frequency/spatial low-frequency signal reconstruction unit 320. Also, the temporal low-frequency/spatial high-frequency signal 3011 is output as an auxiliary signal 3014 to the temporal high-frequency signal generator 313.

Figure 24:
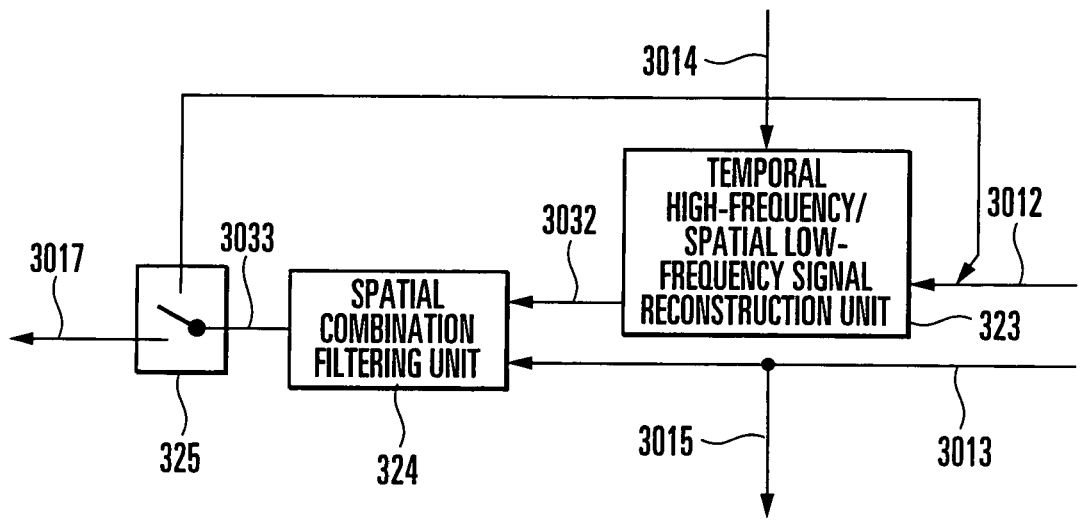
FIG. 24 is a block diagram showing the arrangement of a temporal high-frequency signal generator.
Figure 25:
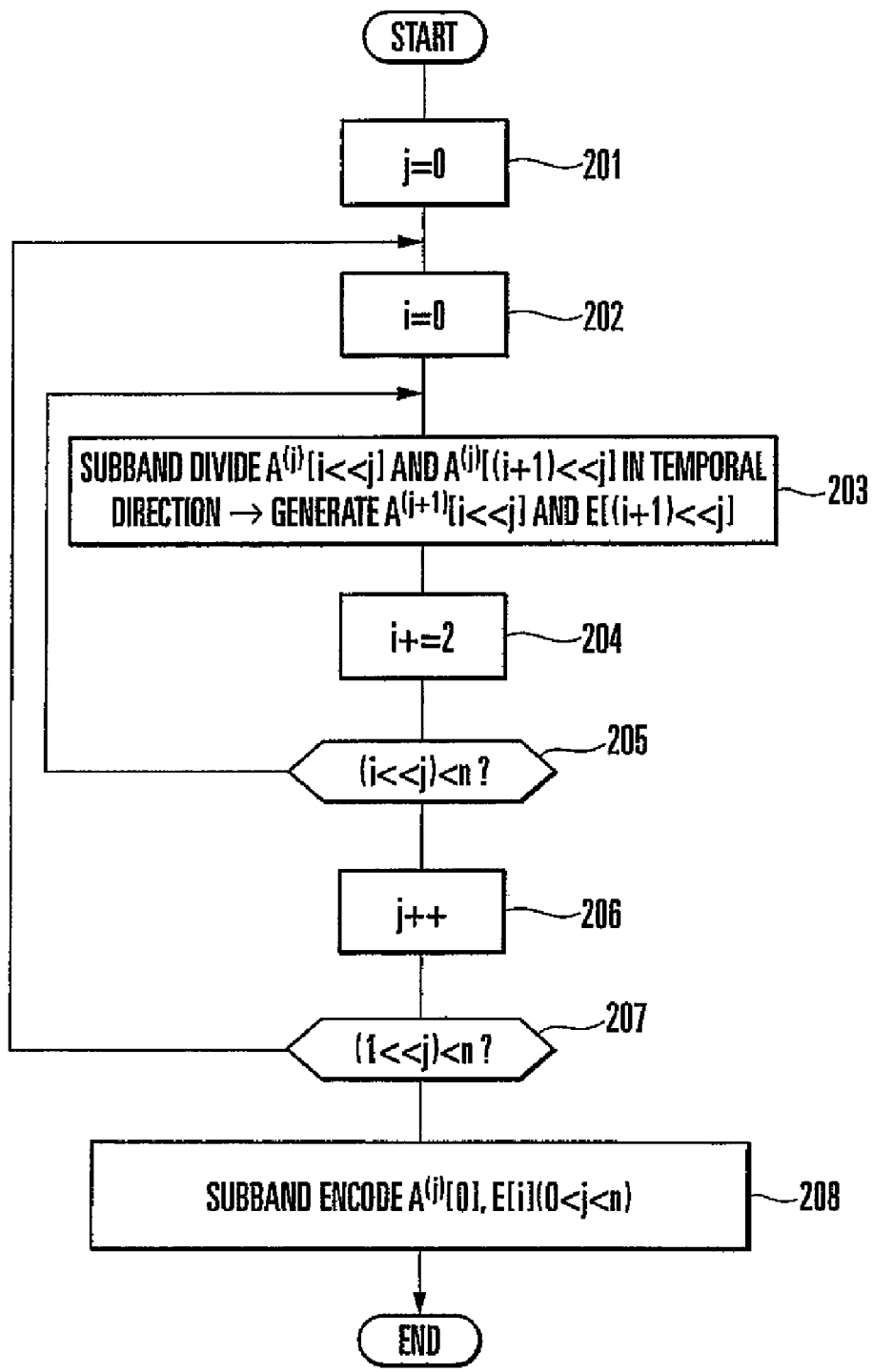
FIG. 25 is a flowchart showing the flow of processing of the first conventional coding method which performs motion compensation in a spatial region.
Figure 26:
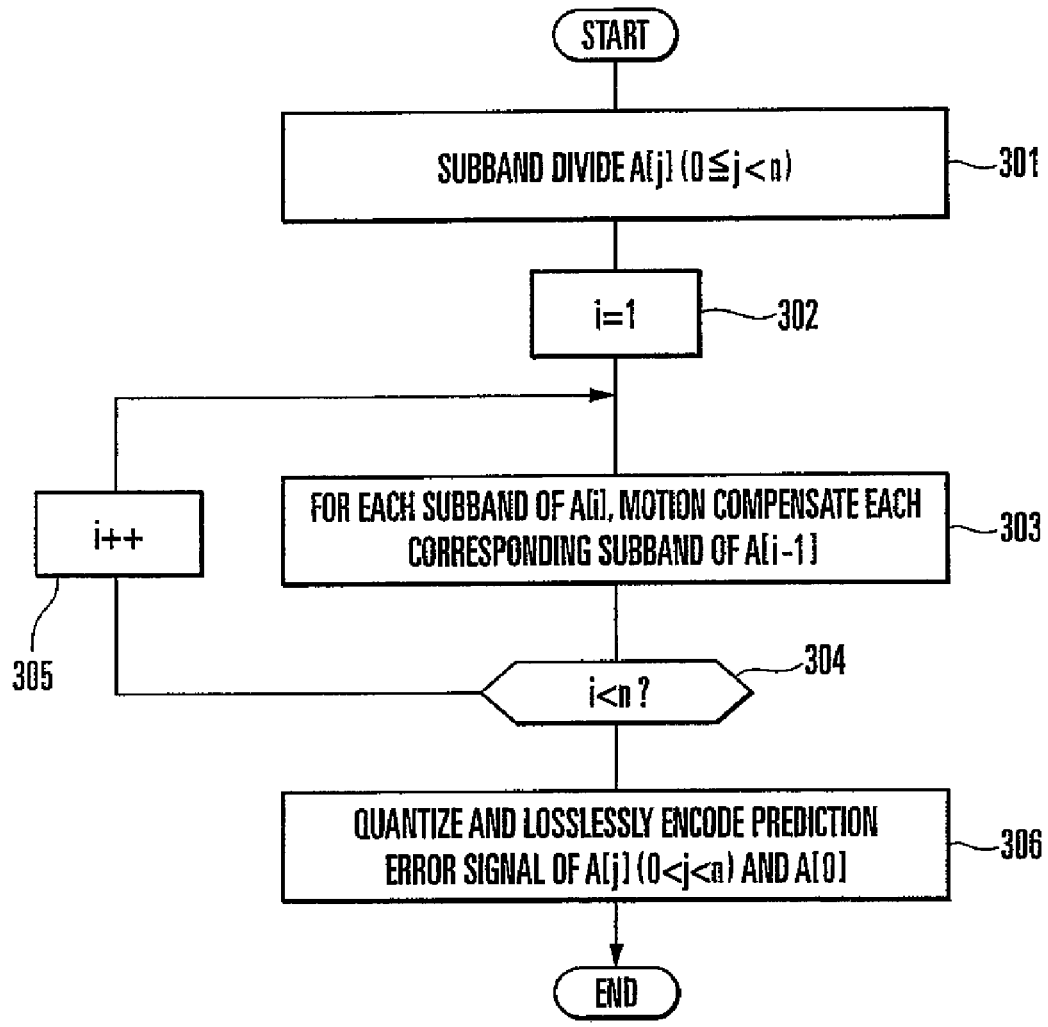
FIG. 26 is a flowchart showing the flow of processing of the second conventional coding method which performs motion compensation in a subband region.

FIG. 24 is a block diagram showing the arrangement of the temporal high-frequency signal generator. A temporal high-frequency/spatial low-frequency signal reconstruction unit 323 reconstructs a temporal high-frequency/spatial low-frequency signal 3032 by referring to the auxiliary signal 3014 output from the temporal high-frequency signal generator and the temporal high-frequency signal 3012. A spatial combination filtering unit 324 spatially hierarchically combines the temporal high-frequency/spatial low-frequency signal 3032 and temporal high-frequency/spatial high-frequency signal 3013 to generate a temporal high-frequency signal 3033. A switch 325 directly outputs the temporal high-frequency signal 3033, or recurrently performs a temporal high-frequency signal generation process as an input to the temporal high-frequency/spatial low-frequency signal reconstruction unit 323. Also, the temporal low-frequency/spatial high-frequency signal 3013 is output as the auxiliary signal 3015 to the temporal high-frequency signal generator 312.

The foregoing is the explanation of the temporal low-frequency signal generator 312 and temporal high-frequency signal generator 313. The explanation of the processing of the temporal/spatial combination filtering will be continued below with reference to FIG. 22. A switch 314 outputs the temporal low-frequency signal 3010, or a temporal low-frequency signal 3016 output from the temporal low-frequency signal generator 312, to temporal-direction inverse filtering 316. A switch 315 outputs the temporal high-frequency signal 3012, or a temporal high-frequency signal 3017 output from the temporal high-frequency signal generator 313, to the temporal-direction inverse filtering 316.

A temporal subband combiner 316 temporally hierarchically combines a temporal low-frequency signal 3018 and temporal high-frequency signal 3019, respectively, output from the switches 314 and 315, thereby reconstructing a moving picture signal 3020. If the moving picture signal 3020 further requires temporal-direction combination, a switch 317 outputs the moving picture signal 3020 to a spatial divisional filtering unit 318. If spatial-direction combination is already performed a predetermined number of times, the moving picture signal 3020 is output as the moving picture signal 3004. To generate the low-frequency divided signal 3002 from the input moving picture signal and recurrently perform temporal/spatial combination filtering, the spatial divisional filtering unit 318 spatially hierarchically divides the input moving picture signal, and outputs a division result signal 3021 to the inverse subband multiplexer 310.

The foregoing is the explanation of the moving picture decoding device as an embodiment of the present invention. Note that the processing of the texture signal decoder 301 in FIG. 20 corresponds to step 152 in FIG. 18. The processing of the temporal/spatial combination filtering unit 303 in FIG. 20 corresponds to steps 156 and 158 in FIG. 18. The determination processes of the switches 302 and 305 in FIG. 20 correspond to steps 153 and 161, respectively, in FIG. 18. The spatial combination filtering unit 304 corresponds to step 154.

Also, in the temporal/spatial combination filtering as the characteristic feature of the present invention, the processing of the temporal low-frequency/spatial low-frequency signal reconstruction unit 320 in FIG. 23 and that of the temporal high-frequency/spatial low-frequency signal reconstruction unit 323 in FIG. 24 correspond to step 173 in FIG. 19. The processing of the spatial combination filtering unit 321 in FIG. 23 and that of the spatial combination filtering unit 324 in FIG. 24 correspond to step 175 in FIG. 19. The determination processes of the switches 322 and 325 in FIGS. 23 and 24, respectively, correspond to step 172 in FIG. 19. The processing of the temporal subband combiner 316 in FIG. 22 corresponds to step 177 in FIG. 19. The determination process of the switch 317 in FIG. 22 corresponds to step 160 in FIG. 18, and the processing of the spatial divisional filtering unit 318 in FIG. 22 corresponds to step 158 in FIG. 18.

One characteristic feature of the temporal/spatial combination filtering according to this embodiment is that a temporal low-frequency/spatial low-frequency signal is reconstructed by referring to a temporal low-frequency signal and temporal high-frequency/spatial high-frequency signal, and a temporal high-frequency/spatial low-frequency signal is reconstructed by referring to a temporal high-frequency signal and temporal low-frequency/spatial high-frequency signal. Another embodiment of the temporal/spatial combination filtering is a method of simultaneously reconstructing a temporal low-frequency/spatial low-frequency signal and temporal high-frequency/spatial low-frequency signal by referring to a temporal low-frequency signal and temporal high-frequency signal alone. In this case, motion compensation in an upper hierarchy is performed on the basis of motion information which is obtained by reducing, in accordance with the resolution, motion information obtained at the original resolution.

Although the case in which the frame reference relationship in temporal-direction subband division takes a hierarchical structure is explained in this embodiment, the present invention is also applicable to a case in which this reference relationship has an arbitrary structure. In addition, the embodiment is explained by limiting it to the case in which a past frame is transformed into a low-frequency-band subband in one temporal-direction subband division, but the present invention can also be applied to a case in which a future frame is transformed into a low-frequency-band subband, or a case in which two frames are divided in the temporal direction in the form of bidirectional prediction. In either case, a low-frequency-band subband obtained when each subband after temporal-direction division is divided in the spatial direction is replaced with a subband obtained by dividing, in the temporal direction, a low-frequency-band subband which is obtained by diving an image to be encoded in the spatial direction, and correction is so performed that decoding results of paired frames are obtained or desired decoding results are obtained by using subbands upon decoding.

Furthermore, although this embodiment uses subband division as a transform method which implements hierarchical encoding, the present invention is also applicable to any arbitrary hierarchical encoding method. In subband division, a signal corresponding to a low frequency band is related to an upper hierarchy. In the encoding method as an embodiment based on the present invention, an upper-hierarchy signal formed by hierarchically dividing a prediction error signal obtained after interframe prediction is replaced with a predicted error obtained by performing interframe prediction on an upper-hierarchy signal after an input image signal is hierarchically divided. In the decoding method, an upper hierarchy of a hierarchized frame signal is corrected to an upper-hierarchy signal formed by hierarchically dividing a prediction error signal obtained by performing interframe prediction on an input image signal.

The invention claimed is:

1. A moving picture encoding method comprising:
obtaining a temporally hierarchized signal by temporally hierarchically dividing a moving picture signal;
obtaining a temporally hierarchized spatial high-frequency signal by performing, by a processor, a high frequency generation process on the temporally hierarchized signal in spatial hierarchical division;
obtaining a reduced image signal by performing a low frequency generation process on the moving picture signal in spatial hierarchical division; and
obtaining a reduced temporally hierarchized signal by temporally hierarchizing the reduced image signal.

2. A moving picture encoding method according to claim 1, wherein the temporally hierarchized spatial high-frequency signal and the reduced temporally hierarchized signal are encoded.

3. A moving picture encoding method comprising:
obtaining a prediction error signal by performing interframe prediction on a moving picture signal;
obtaining a prediction error spatial high-frequency signal by performing, by a processor, a high frequency generation process on the prediction error signal in spatial hierarchical division;
obtaining a reduced image signal by performing a low-frequency signal generation process on the moving picture signal in the spatial hierarchical division; and
obtaining a reduced interframe prediction error signal as a prediction error signal by performing interframe prediction on the reduced image signal.

4. A moving picture encoding method according to claim 3, wherein the prediction error spatial high-frequency signal and the reduced interframe prediction error signal are encoded.

5. A moving picture encoding method of performing a three-dimensional subband dividing process which performs motion compensation prediction on a moving picture signal and also subband divides the moving picture signal in a spatial direction, the three-dimensional subband dividing process comprising:
a motion detection operation of obtaining motion information by detecting an interframe motion of the moving picture signal;
a motion compensation prediction operation of obtaining a prediction error signal by performing, by a processor, motion compensation prediction on the moving picture signal in accordance with the motion information;
a prediction error signal spatial division operation of generating a spatial low-frequency prediction error subband signal and a spatial high-frequency prediction error subband signal by spatially subband dividing the prediction error signal; and
a band signal spatial division operation of generating a spatial low-frequency intra-subband signal and spatial high-frequency intra-subband signal by spatially subband dividing the moving picture signal.

6. A moving picture encoding method according to claim 5, wherein the motion compensation prediction operation, the prediction error signal spatial division operation, and the band signal spatial division operation are performed on the moving picture signal, and the motion compensation prediction operation, the prediction error signal spatial division operation, and the band signal spatial division operation are recurrently repeated by replacing the spatial low-frequency intra-subband signal obtained after the band signal spatial division operation with the moving picture signal.

7. A moving picture encoding method of performing a three-dimensional subband dividing process which subband divides a moving picture signal in both a temporal direction and spatial direction, the three-dimensional subband dividing process comprising:
   a motion detection operation of obtaining motion information by detecting an interframe motion of the moving picture signal;
   a temporal subband division operation of obtaining a temporal low-frequency subband signal and temporal high-frequency subband signal by motion compensating, by a processor, the moving picture signal in accordance with the motion information, and temporally subband dividing the motion compensated moving picture signal;
   a temporal high-frequency subband spatial division operation of generating a temporal high-frequency/spatial low-frequency subband signal and a temporal high-frequency/spatial high-frequency subband signal by spatially subband dividing the temporal high-frequency subband signal;
   a temporal low-frequency subband spatial division operation of generating a temporal low-frequency/spatial low-frequency subband signal and a temporal low-frequency/spatial high-frequency subband signal by spatially subband dividing the temporal low-frequency subband signal; and
   a band signal spatial division operation of generating a spatial low-frequency intra-subband signal and a spatial high-frequency intra-subband signal by spatially subband dividing the moving picture signal.

8. A moving picture encoding method according to claim 7, wherein the temporal subband division operation, the temporal high-frequency subband spatial division operation, the temporal low-frequency subband spatial division operation, and the band signal spatial division operation are performed on the moving picture signal, and the temporal subband division operation, the temporal high-frequency subband spatial division operation, the temporal low-frequency subband spatial division operation, and the band signal spatial division step are recurrently repeated by replacing the spatial low-frequency intra-subband signal obtained after the band signal spatial division operation with the moving picture signal.

9. A moving picture encoding method comprising:
   obtaining a time filtering signal by filtering a moving picture signal in a temporal direction;
   obtaining a time filtering lower hierarchy signal and time filtering upper hierarchy signal by spatially hierarchically dividing the time filtering signal;
   obtaining an upper hierarchy moving picture signal by spatially hierarchically dividing the moving picture signal;
   obtaining, by a processor, an upper hierarchy time filtering signal by filtering the upper hierarchy moving picture signal in the temporal direction; and
   encoding the time filtering lower hierarchy signal and the upper hierarchy time filtering signal.

10. A moving picture encoding method according to claim 9, further comprising:
   replacing the time filtering upper hierarchy signal with the upper hierarchy time filtering signal.

11. A non-transitory computer readable medium having stored therein a moving picture encoding program of for executing a method comprising:
   obtaining a temporally hierarchized signal by temporally hierarchically dividing a moving picture signal;
   obtaining a temporally hierarchized spatial high-frequency signal by performing a high frequency generation process on the temporally hierarchized signal in spatial hierarchical division;
   obtaining a reduced image signal by performing a low frequency generation process on the moving picture signal in the spatial hierarchical division; and
   obtaining a reduced temporally hierarchized signal by temporally hierarchizing the reduced image signal.

12. A moving picture encoding program according to claim 11, wherein the temporally hierarchized spatial high-frequency signal and the reduced temporally hierarchized signal are encoded.

13. A non-transitory computer readable medium having stored therein a moving picture encoding program for executing a method comprising:
   obtaining a prediction error signal by performing interframe prediction on a moving picture signal;
   obtaining a prediction error spatial high-frequency signal by performing a high frequency generation process on the prediction error signal in spatial hierarchical division;
   obtaining a reduced image signal by performing a low-frequency signal generation process on the moving picture signal in the spatial hierarchical division; and
   obtaining a reduced interframe prediction error signal as a prediction error signal by performing interframe prediction on the reduced image signal.

14. A moving picture encoding program according to claim 13, wherein the prediction error spatial high-frequency signal and the reduced interframe prediction error signal are encoded.

15. A non-transitory computer readable medium having stored therein a moving picture encoding program of performing a three-dimensional subband dividing process which performs motion compensation prediction on a moving picture signal and also subband divides the moving picture signal in a spatial direction, the three-dimensional subband dividing process comprising:
   a motion detection operation of obtaining motion information by detecting an interframe motion of the moving picture signal;
   a motion compensation prediction operation of obtaining a prediction error signal by performing motion compensation prediction on the moving picture signal in accordance with the motion information;
   a prediction error signal spatial division operation of generating a spatial low-frequency prediction error subband signal and a spatial high-frequency prediction error subband signal by spatially subband dividing the prediction error signal; and
   a band signal spatial division operation of generating a spatial low-frequency intra-subband signal and a spatial high-frequency intra-subband signal by spatially subband dividing the moving picture signal.

16. A moving picture encoding program according to claim 15, wherein the motion compensation prediction operation, the prediction error signal spatial division operation, and the band signal spatial division operation are performed on the moving picture signal, and the motion compensation prediction operation, the prediction error signal spatial division operation, and the band signal spatial division operation are recurrently repeated by replacing the spatial low-frequency intra-subband signal obtained after the band signal spatial division step with the moving picture signal.

17. A non-transitory computer readable medium having stored therein a moving picture encoding program of performing a three-dimensional subband dividing process which subband divides a moving picture signal in both a temporal direction and spatial direction, the three-dimensional subband dividing process comprising:
   a motion detection operation of obtaining motion information by detecting an interframe motion of the moving picture signal;
   a temporal subband division operation of obtaining a temporal low-frequency subband signal and a temporal high-frequency subband signal by motion compensating the moving picture signal in accordance with the motion information, and temporally subband dividing the motion compensated moving picture signal;
   a temporal high-frequency subband spatial division operation of generating a temporal high-frequency/spatial low-frequency subband signal and a temporal high-frequency/spatial high-frequency subband signal by spatially subband dividing the temporal high-frequency subband signal;
   a temporal low-frequency subband spatial division operation of generating a temporal low-frequency/spatial low-frequency subband signal and a temporal low-frequency/spatial high-frequency subband signal by spatially subband dividing the temporal low-frequency subband signal; and
   a band signal spatial division operation of generating a spatial low-frequency intra-subband signal and a spatial high-frequency intra-subband signal by spatially subband dividing the moving picture signal.

18. A moving picture encoding program according to claim 17, wherein the temporal subband division operation, the temporal high-frequency subband spatial division operation, the temporal low-frequency subband spatial division operation, and the band signal spatial division operation are performed on the moving picture signal, and the temporal subband division operation, the temporal high-frequency subband spatial division operation, the temporal low-frequency subband spatial division operation, and the band signal spatial division operation are recurrently repeated by replacing the spatial low-frequency intra-subband signal obtained after the band signal spatial division operation with the moving picture signal.

19. A non-transitory computer readable medium having stored therein a moving picture encoding program for executing a method comprising:
   obtaining a time filtering signal by filtering a moving picture signal in a temporal direction;
   obtaining a time filtering lower hierarchy signal and a time filtering upper hierarchy signal by spatially hierarchically dividing the time filtering signal;
   obtaining an upper hierarchy moving picture signal by spatially hierarchically dividing the moving picture signal;
   obtaining an upper hierarchy time filtering signal by filtering the upper hierarchy moving picture signal in the temporal direction; and
   encoding the time filtering lower hierarchy signal and the upper hierarchy time filtering signal.

20. A moving picture encoding program according to claim 19, further comprising:
   replacing the time filtering upper hierarchy signal with the upper hierarchy time filtering signal.

21. A moving picture encoding device comprising:
   means for obtaining a temporally hierarchized signal by temporally hierarchically dividing a moving picture signal;
   means for obtaining a temporally hierarchized spatial high-frequency signal by performing a high frequency generation process on the temporally hierarchized signal in spatial hierarchical division;
   means for obtaining a reduced image signal by performing a low frequency generation process on the moving picture signal in the spatial hierarchical division; and
   means for obtaining a reduced temporally hierarchized signal by temporally hierarchizing the reduced image signal.

22. A moving picture encoding device according to claim 21, wherein the temporally hierarchized spatial high-frequency signal and the reduced temporally hierarchized signal are encoded.

23. A moving picture encoding device comprising:
   means for obtaining a prediction error signal by performing interframe prediction on a moving picture signal;
   means for obtaining a prediction error spatial high-frequency signal by performing a high frequency generation process on the prediction error signal in spatial hierarchical division;
   means for obtaining a reduced image signal by performing a low-frequency signal generation process on the moving picture signal in the spatial hierarchical division; and
   means for obtaining a reduced interframe prediction error signal as a prediction error signal by performing interframe prediction on the reduced image signal.

24. A moving picture encoding device according to claim 23, wherein the prediction error spatial high-frequency signal and the reduced interframe prediction error signal are encoded.

25. A moving picture encoding device for performing a three-dimensional subband dividing process which performs motion compensation prediction on a moving picture signal and also subband divides the moving picture signal in a spatial direction, the three-dimensional subband dividing process comprising:
   motion detecting means for obtaining motion information by detecting an interframe motion of the moving picture signal;
   motion compensation predicting means for obtaining a prediction error signal by performing motion compensation prediction on the moving picture signal in accordance with the motion information;
   prediction error signal spatial dividing means for generating a spatial low-frequency prediction error subband signal and a spatial high-frequency prediction error subband signal by spatially subband dividing the prediction error signal; and
   band signal spatial dividing means for generating a spatial low-frequency intra-subband signal and a spatial high-frequency intra-subband signal by spatially subband dividing the moving picture signal.

26. A moving picture encoding device according to claim 25, wherein said motion compensation predicting means, said prediction error signal spatial dividing means, and said band signal spatial dividing means are performed on the moving picture signal, and the processes of said motion compensation predicting means, said prediction error signal spatial dividing means, and said band signal spatial dividing means are recurrently repeated by replacing the spatial low-frequency intra-subband signal obtained after said band signal spatial dividing means with the moving picture signal.

27. A moving picture encoding device for performing a three-dimensional subband dividing process which subband divides a moving picture signal in both a temporal direction and spatial direction, the three-dimensional subband dividing process comprising:
- motion detecting means for obtaining motion information by detecting an interframe motion of the moving picture signal;
- temporal subband dividing means for obtaining a temporal low-frequency subband signal and a temporal high-frequency subband signal by motion compensating the moving picture signal in accordance with the motion information, and temporally subband dividing the motion compensated moving picture signal;
- temporal high-frequency subband spatial dividing means for generating a temporal high-frequency/spatial low-frequency subband signal and a temporal high-frequency/spatial high-frequency subband signal by spatially subband dividing the temporal high-frequency subband signal;
- temporal low-frequency subband spatial dividing means for generating a temporal low-frequency/spatial low-frequency subband signal and a temporal low-frequency/spatial high-frequency subband signal by spatially subband dividing the temporal low-frequency subband signal; and
- band signal spatial dividing means for generating a spatial low-frequency intra-subband signal and a spatial high-frequency intra-subband signal by spatially subband dividing the moving picture signal.

28. A moving picture encoding device according to claim 27, wherein said temporal subband dividing means, said temporal high-frequency subband spatial dividing means, said temporal low-frequency subband spatial dividing means, and said band signal spatial diving means are performed on the moving picture signal, and the processes of said temporal subband dividing means, said temporal high-frequency subband spatial dividing means, said temporal low-frequency subband spatial dividing means, and said band signal spatial dividing means are recurrently repeated by replacing the spatial low-frequency intra-subband signal obtained after said band signal spatial dividing means with the moving picture signal.

29. A moving picture encoding device comprising:
- means for generating a temporal high-frequency/spatial low-frequency signal by using a temporal high-frequency signal, a temporal low-frequency signal, and a temporal low-frequency/spatial high-frequency signal;
- means for generating a second temporal low-frequency signal by using the temporal low-frequency signal and the temporal low-frequency/spatial high-frequency signal;
- means for generating a second temporal high-frequency signal by using the temporal high-frequency/spatial low-frequency signal and a temporal high-frequency/spatial high-frequency signal; and
- means for combining the second temporal low-frequency signal and the second temporal high-frequency signal.

30. A moving picture encoding device comprising:
- means for obtaining a time filtering signal by filtering a moving picture signal in a temporal direction;
- means for obtaining a time filtering lower hierarchy signal and a time filtering upper hierarchy signal by spatially hierarchically dividing the time filtering signal;
- means for obtaining an upper hierarchy moving picture signal by spatially hierarchically dividing the moving picture signal;
- means for obtaining an upper hierarchy time filtering signal by filtering the upper hierarchy moving picture signal in the temporal direction; and
- means for encoding the time filtering lower hierarchy signal and the upper hierarchy time filtering signal.

31. A moving picture encoding device according to claim 30, further comprising:
- means for replacing the time filtering upper hierarchy signal with the upper hierarchy time filtering signal.

\* \* \* \* \*